United States Patent
Maeda et al.

(10) Patent No.: US 10,411,904 B2
(45) Date of Patent: Sep. 10, 2019

(54) METHOD OF AUTHENTICATING DEVICES USING CERTIFICATES

(71) Applicant: Panasonic Intellectual Property Management Co., Ltd., Osaka (JP)

(72) Inventors: Manabu Maeda, Osaka (JP); Natsume Matsuzaki, Osaka (JP); Motoji Ohmori, Osaka (JP); Hideki Matsushima, Osaka (JP); Tomoyuki Haga, Nara (JP); Yuji Unagami, Osaka (JP); Yoshihiro Ujiie, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 490 days.

(21) Appl. No.: 15/164,911

(22) Filed: May 26, 2016

(65) Prior Publication Data
US 2016/0277195 A1 Sep. 22, 2016

Related U.S. Application Data

(63) Continuation of application No. PCT/JP2014/005627, filed on Nov. 10, 2014.
(Continued)

(51) Int. Cl.
*H04L 9/32* (2006.01)
*H04L 29/06* (2006.01)
*H04L 9/00* (2006.01)

(52) U.S. Cl.
CPC ............ *H04L 9/3268* (2013.01); *H04L 9/006* (2013.01); *H04L 9/3297* (2013.01); *H04L 63/0823* (2013.01); *H04L 63/0853* (2013.01)

(58) Field of Classification Search
CPC ..... H04L 9/3268; H04L 9/006; H04L 9/3297; H04L 63/0823; H04L 63/0853
See application file for complete search history.

(56) References Cited

U.S. PATENT DOCUMENTS

| | | | | |
|---|---|---|---|---|
| 8,320,879 B2* | 11/2012 | Willey | .................. | H04L 63/062 380/247 |
| 2004/0003239 A1* | 1/2004 | Ohmori | ............ | G11B 20/00086 713/158 |

(Continued)

FOREIGN PATENT DOCUMENTS

| | | |
|---|---|---|
| JP | 2003-115840 | 4/2003 |
| JP | 2005-332377 | 12/2005 |
| JP | 2013-077196 | 4/2013 |

OTHER PUBLICATIONS

International Search Report of PCT application No. PCT/JP2014/005627 dated Jan. 20, 2015.
(Continued)

*Primary Examiner* — Sharon S Lynch
(74) *Attorney, Agent, or Firm* — Greenblum & Bernstein, P.L.C.

(57) ABSTRACT

A first device, upon detecting participation in an authentication system, transmits new and old identification information of a first certificate revocation list that the first device manages to a second device. In a case where the new and old identification information of a second certificate revocation list that the second device manages is older than the new and old identification information of the received first certificate revocation list, the second device transmits a transmission request for the first certificate revocation list to the first device. Upon receiving the transmission request for the first certificate revocation list from the second device, the first device transmits the first certificate revocation list to the second device. the second device updates the second cer-
(Continued)

tificate revocation list using the received first certificate revocation list.

4 Claims, 39 Drawing Sheets

Related U.S. Application Data

(60) Provisional application No. 61/916,570, filed on Dec. 16, 2013.

(56) References Cited

U.S. PATENT DOCUMENTS

| | | | | |
|---|---|---|---|---|
| 2005/0071631 | A1* | 3/2005 | Langer | H04L 9/0833 713/156 |
| 2005/0235361 | A1 | 10/2005 | Alkove et al. | |
| 2006/0282664 | A1* | 12/2006 | Zhao | H04L 63/101 713/158 |
| 2007/0220616 | A1* | 9/2007 | Oh | G06F 21/10 726/30 |
| 2007/0234045 | A1* | 10/2007 | Ishiyama | H04L 63/0823 713/158 |
| 2007/0294526 | A1* | 12/2007 | Medvinsky | H04N 21/235 713/158 |
| 2008/0010451 | A1* | 1/2008 | Holtzman | H04L 9/3228 713/158 |
| 2008/0034204 | A1* | 2/2008 | Lakshminarayanan | H04L 63/0823 713/158 |
| 2008/0148046 | A1* | 6/2008 | Glancey | G06F 21/33 713/156 |
| 2009/0187983 | A1* | 7/2009 | Zerfos | H04L 63/0823 726/10 |
| 2009/0260057 | A1* | 10/2009 | Laberteaux | H04L 63/0823 726/2 |
| 2010/0138652 | A1* | 6/2010 | Sela | G06F 21/445 713/158 |
| 2011/0083011 | A1* | 4/2011 | DiCrescenzo | H04L 9/006 713/158 |
| 2011/0161663 | A1* | 6/2011 | Nakhjiri | H04L 63/0823 713/158 |
| 2012/0030461 | A1* | 2/2012 | Willey | H04L 63/062 713/158 |
| 2012/0054487 | A1* | 3/2012 | Sun | G06F 21/64 713/158 |
| 2013/0290705 | A1* | 10/2013 | Lovmand | H04L 63/0823 713/156 |
| 2014/0129829 | A1* | 5/2014 | Unagami | H04L 9/3268 713/158 |
| 2014/0281502 | A1* | 9/2014 | Keung Chan | H04L 9/3265 713/157 |
| 2016/0065377 | A1* | 3/2016 | Ichijo | H04W 12/12 713/175 |
| 2016/0072630 | A1* | 3/2016 | Ujiie | G06F 21/33 713/158 |
| 2017/0012785 | A1* | 1/2017 | Haga | G06F 21/33 |

OTHER PUBLICATIONS

"Wi-Fi Certified Wi-Fi Protected Setup (TM)" Wi-Fi Alliance, Dec. 2010.

Atsuko Miyaji et al., "Information Security" Ohm-sha pp. 140-147, Oct. 25, 2003 (Partial Translation).

"Suite B Implementers Guide to FIPS 186-3 (ECDSA)" Feb. 3, 2010.

Elaine Barker et al., "Recommendation for Pair-Wise Key Establishment Schemes Using Discrete Logarithm Cryptography" NIST Special Publication 800-56A Revision2.

D. Forsberg et al., "Protocol for Carrying Authentication for Network Access (PANA)", RFC5191, May 2008.

The Extended European Search Report dated Nov. 14, 2016 for the European Patent Application No. 14871853.9.

\* cited by examiner

| DEVICE ID | CERTIFICATE ID |
|---|---|
| DEVICE ID1 | CERTIFICATE ID (M1) |
| DEVICE ID2 | CERTIFICATE ID (M2) |
| DEVICE ID3 | CERTIFICATE ID (M3) |
| ... | ... |

FIG. 7

| CONTROLLER ID | CERTIFICATE ID |
|---|---|
| CONTROLLER ID1 | CERTIFICATE ID (C1) |
| CONTROLLER ID2 | CERTIFICATE ID (C2) |
| ... | ... |

FIG. 9

| CONTROLLER ID | CERTIFICATE ID OF CONTROLLER | DEVICE ID | CERTIFICATE ID OF DEVICE | HISTORY INFORMATION |
|---|---|---|---|---|
| CONTROLLER ID1 | CERTIFICATE ID (C1) | DEVICE ID1 | CERTIFICATE ID (M1) | HISTORY INFORMATION 1 |
| | | DEVICE ID2 | CERTIFICATE ID (M2) | HISTORY INFORMATION 2 |
| | | DEVICE ID3 | CERTIFICATE ID (M3) | HISTORY INFORMATION 3 |
| ⋮ | | ⋮ | | |

FIG. 20

| CONTROLLER ID | CERTIFICATE ID | SHARED KEY |
|---|---|---|
| CONTROLLER ID1 | CERTIFICATE ID (C1) | 96385 ... |
| CONTROLLER ID2 | CERTIFICATE ID (C2) | 19283 ... |
| ... | ... | |

FIG. 21

| DEVICE ID | CERTIFICATE ID | SHARED KEY |
|---|---|---|
| DEVICE ID1 | CERTIFICATE ID (M1) | 01234 ... |
| DEVICE ID2 | CERTIFICATE ID (M2) | 98765 ... |
| DEVICE ID3 | CERTIFICATE ID (M3) | 19283 ... |
| ... | ... | ... |

METHOD OF AUTHENTICATING DEVICES USING CERTIFICATES

BACKGROUND

1. Technical Field

The present disclosure relates to a method of authenticating devices using certificates.

2. Description of the Related Art

In recent years, home electric appliance devices and audiovisual devices have come to be connected to networks, and there is anticipation for services using various types of history information collected therefrom to the cloud. In this arrangement, a controller is installed in the home, and transmission of history information from the home electric appliance devices to a manufacturer's server is relayed through the controller. Setting the connection between the controller and the home electric appliance devices so as to be safe enables communication within the home to be controlled, and leakage of information over wireless communication and connection to the in-home network by spoofing to be prevented.

To this end, the Wi-Fi Alliance has conventionally set forth a standard to facilitate connection among devices, called Wi-Fi Protected Setup (See Wi-Fi Alliance, "Wi-Fi CERTIFIED Wi-Fi Protected Setup: Easing the User Experience for Home and Small Office Wi-FiR Networks (2010)", [online], December 2010, [Searched Jun. 24, 2014], Internet <URL: http://www.wi-fi.org/ja/file/wi-fi-certified-wi-fi-protected-setup%E2%84%A2-easing-the-user-experience-for-home-and-small-office-wi>). However, in Wi-Fi wireless connection, this only guarantees interconnection among devices at an access point of devices and home electric appliance devices, that is equivalent to a controller, and does not guarantee whether a connecting device is valid or not.

Usage of the Public Key Infrastructure (PKI) to authenticate the validity of devices has been conventionally known (See Atsuko Miyaji/Hiroaki Kikuchi, "IT Text Information Security" published by Ohmsha, October 2003 (hereinafter referred to as "Miyaji and Kikuchi"). Authentication based on PKI guarantees the validity of devices by authenticating that an entity (home electric appliance device or controller) has a secret key and a public key certificate issued by a certificate authority. Once there is an occurrence of leakage of a secret key or the like regarding a public key certificate, the public key certificate needs to be revoked in order to prevent unauthorized use of the public key certificate. A representative way to revoke a public key certificate is a Certificate Revocation List (CRL) which is a list of certificate revocations (See Miyaji and Kikuchi). A CRL is a list of revoked public key certificates, with IDs and the like of revoked public key certificates affixed with the signature of the certificate authority that has issued the public key certificate, and distributed. The entity such as the home electric appliance device or controller verifies whether the public key certificate of another entity to which it is to connect is not listed in the CRL. Accordingly, the newest CRL needs to be used as the CRL.

SUMMARY

Further improvement has been needed with the above-described conventional authentication system.

In one general aspect, the techniques disclosed here feature a method executed in an authentication system including three or more devices, the three or more devices including a first device and a second device, the first device managing a list of revoked certificates, which is a first certificate revocation list including new and old identification information, and the second device managing a list of revoked certificates, which is a second certificate revocation list including new and old identification information. The method includes: the second device receiving the new and old identification information of the first certificate revocation list transmitted from the first device that has newly participated in the authentication system; the second device comparing the new and old identification information of the second certificate revocation list with the new and old identification information of the received first certificate revocation list; the second device updating the second certificate revocation list using the first certificate revocation list received from the first device, in a case where the new and old identification information of the second certificate revocation list is older than the new and old identification information of the received first certificate revocation list; and the second device performing, in a case where a device which has already participated in the authentication system is registered in the updated second certificate revocation list, batch transmission of an identifier of the registered device to a plurality of devices which have already participated in the authentication system.

According to the present disclosure, further improvement can be realized.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 7 is a diagram illustrating an example of a connection controller management table of the device according to the first embodiment;

FIG. 9 is a diagram illustrating an example of a device information management table of the manufacturer server according to the first embodiment;

FIG. 20 is a diagram illustrating an example of a connection controller management table of the device according to the second embodiment;

FIG. 21 is a diagram illustrating an example of a connecting device management table of the controller according to the second embodiment;

DETAILED DESCRIPTION

Figure 1:
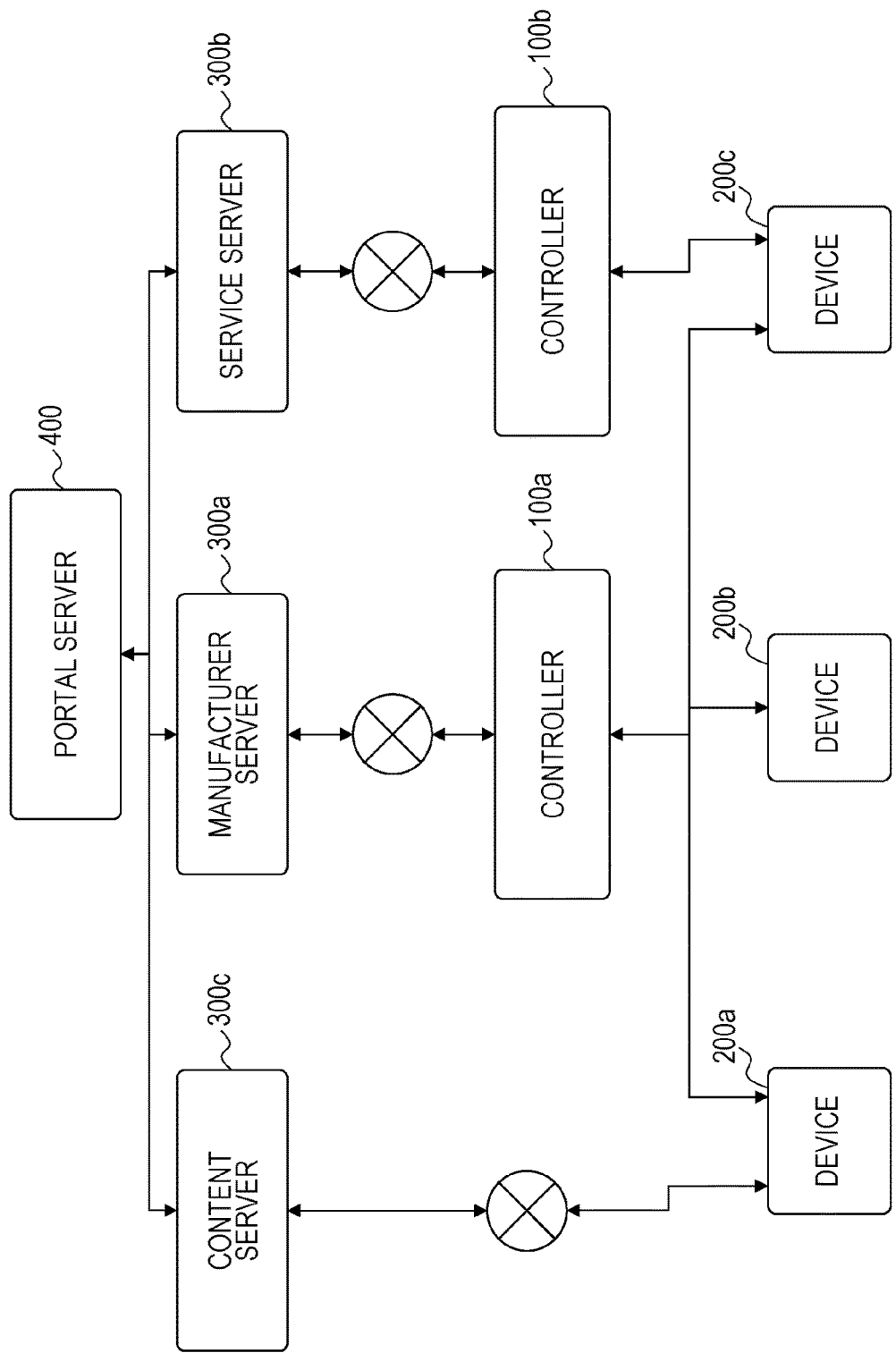
FIG. 1 is an overall configuration diagram of an authentication system according to a first embodiment.

Underlying Knowledge Forming Basis of the Present Disclosure

In a case where a home electric appliance device connects only to one controller, the home electric appliance device acquires the CRL via the controller. At this time, if the controller is an unauthorized device, even If the public key certificate is listed in the CRL, the home electric appliance device will authenticate the controller as a valid device unless the controller distributes a CRL, in which the public key certificate of the controller is listed, to the home electric appliance device.

Also, in a case where the controller is not connected to an external network such as a server, even if the CRL is updated at the server side, the neither the controller nor the home appliance device is connected to the server, so the CRL cannot be updated. Accordingly, even if there is an unauthorized controller or an unauthorized home appliance device, there are continued to be recognized as valid devices.

Based on the above observation, the present inventors arrived at the aspects of the present disclosure.

A method according to an embodiment of the present disclosure is executed in an authentication system including three or more devices, the three or more devices including a first device and a second device, the first device managing a list of revoked certificates, which is a first certificate revocation list including new and old identification information, and the second device managing a list of revoked certificates, which is a second certificate revocation list including new and old identification information.

The method includes:

the second device receiving the new and old identification information of the first certificate revocation list transmitted from the first device that has newly participated in the authentication system;

the second device comparing the new and old identification information of the second certificate revocation list with the new and old identification information of the received first certificate revocation list;

the second device updating the second certificate revocation list using the first certificate revocation list received from the first device, in a case where the new and old identification information of the second certificate revocation list is older than the new and old identification information of the received first certificate revocation list; and the second device performing, in a case where a device which has already participated in the authentication system is registered in the updated second certificate revocation list, batch transmission of an identifier of the registered device to a plurality of devices which have already participated in the authentication system.

Accordingly, in a case where the second certificate revocation list managed by the second device that has already participated in the authentication system is older than the first certificate revocation list of the first device that has participated in the authentication system, the second certificate revocation list can be updated by the first certificate revocation list.

The authentication system according to embodiments of the present disclosure will be described below with reference to the drawings. Note that the embodiments described below indicate a preferred specific example of the present disclosure. That is to say, values, shapes, materials, components, placement and connection arrangement of components, steps, orders of steps, and so forth in the following embodiments are only exemplary, and are not intended to restrict the present disclosure. The present disclosure is defined based on the scope of the Claims. Accordingly, components in the following embodiments which are not included in an independent Claim of the present disclosure indicating the highest concept are described as being components which are not necessarily indispensable in achieving solving of the problem but make up a more preferable form.

First Embodiment

1. System Configuration

An authentication system 10 according to the present disclosure will be described here as an embodiment of the present disclosure, with reference to the drawings.

1.1 Overall Configuration of Authentication System 10

FIG. 1 is a diagram illustrating the overall configuration of the authentication system 10 according to the present disclosure. The authentication system 10 is configured including controllers 100, devices 200, servers 300, and a portal server 400. The controllers 100a to b are devices having functions of controlling devices. The controllers 100a to b also have functions of connecting to servers, transmitting information of home electric appliance devices to the server, receiving control requests from the servers, controlling the home electric appliance devices, and so forth. The devices 200a through c are home electric appliance devices and housing facility devices that collect device history information, such as televisions, recorders, air conditioners, refrigerators, batteries, and so forth. The servers 300a through c are a content server that distributes content, a manufacturer server of a manufacturer that manufactures home electric appliance devices, and a service server of a service provider that provides services. As a specific example, history information of a device in the home is transmitted to the controller, and the control transmits history information of the device to the manufacturer server. Also, in a case where the service server is an electric power company, the electric power company connects to the controller via a home smart meter (omitted from illustration). The controller controls devices in the home based on electric power information from the electric power company, and suppresses consumption of electric power within the home.

1.2 Configuration of Controller 100

Figure 2:
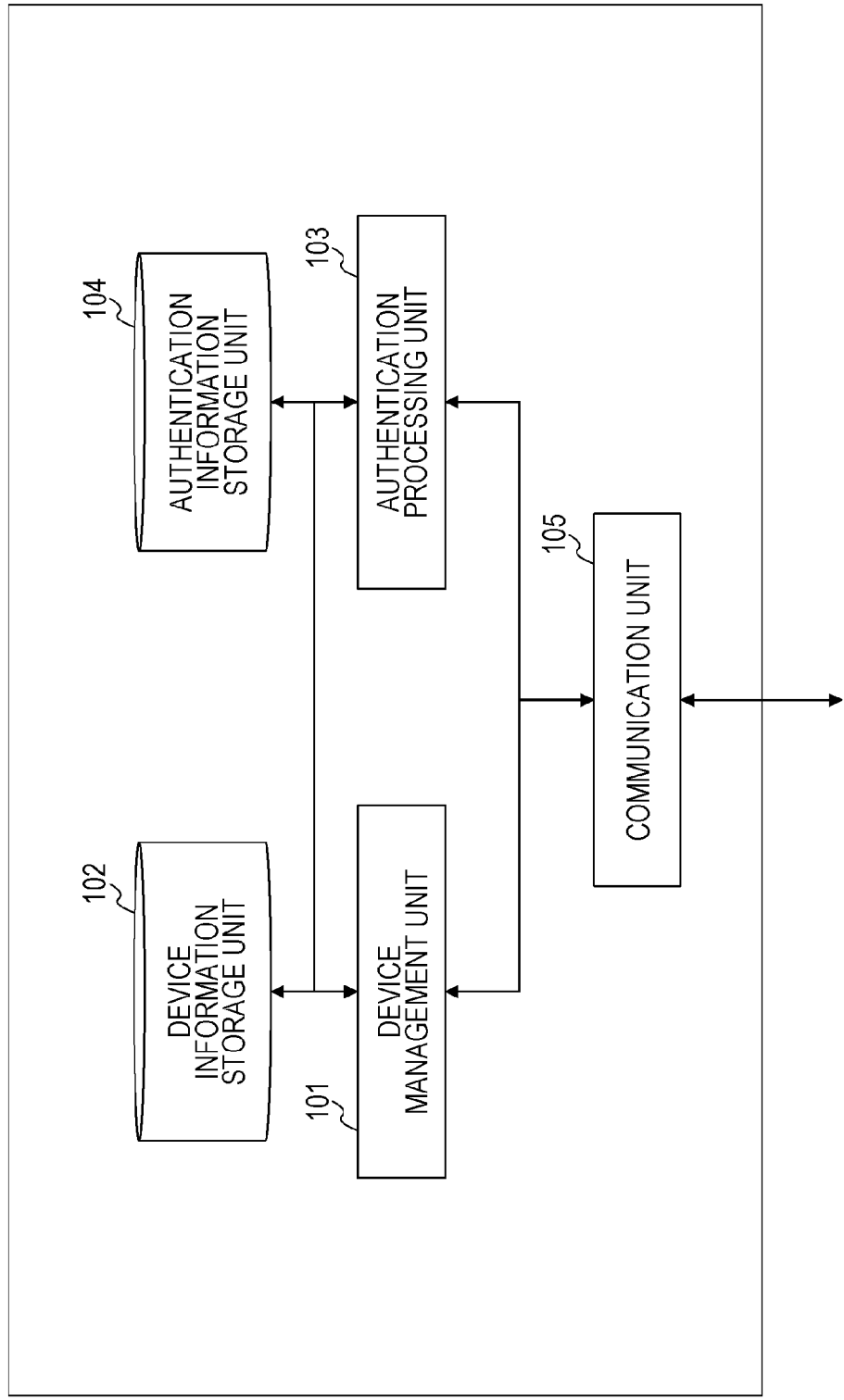
FIG. 2 is a configuration diagram of a controller according to the first embodiment.

FIG. 2 is a configuration diagram of the controller 100a. The controller 100a is configured including a device management unit 101, a device information storage unit 102, an authentication processing unit 103, an authentication information storage unit 104, and a communication unit 105. The controller 100b also is of the same configuration.

The device management unit 101 manages devices connected to the controller. In a case where there is a connection request from a device, the device management unit 101 transmits the public key certificate received from the device to the authentication processing unit 103, and requests authentication processing. The device management unit 101 receives the authentication results from the authentication processing unit 103. In a case where authentication has been successful, the device management unit 101 registers the device ID and certificate ID in a connecting device management table stored at the device information storage unit 102.

Figures 3, 4:
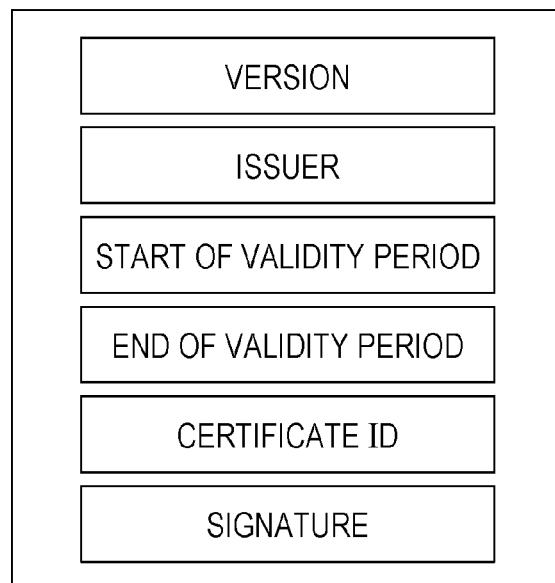
FIG. 3 is a diagram illustrating an example of a connection device management table of the controller according to the first embodiment.
FIG. 4 is a diagram illustrating an example of a public key certificate according to the first embodiment.

The device information storage unit 102 manages information of devices connecting to the controller. FIG. 3 is a diagram illustrating an example of a device information management table which the device information storage unit 102 stores. The device information management table records device IDs and certificate IDs of the public key certificates that the devices store.

The authentication processing unit 103 performs authentication processing with the devices. Also, upon receiving an authentication request from the device management unit 101 along with a public key certificate of a device, the authentication processing unit 103 acquires the CRL recorded in the authentication information storage unit 104, and verifies whether the certificate ID of the public key certificate of the device is recorded in the CRL. The authentication processing unit 103 also verifies the signature of the public key certificate using the public key (omitted from illustration) of the portal server, which is the certificate authority. The authentication processing unit 103 also generates a random number and transmits the random number to the device. The authentication processing unit 103 verifies a signature of the random number received from the device. In a case where any one of the verifications fails, the authentication processing unit 103 determines that the device is an unauthorized device.

Figure 5:
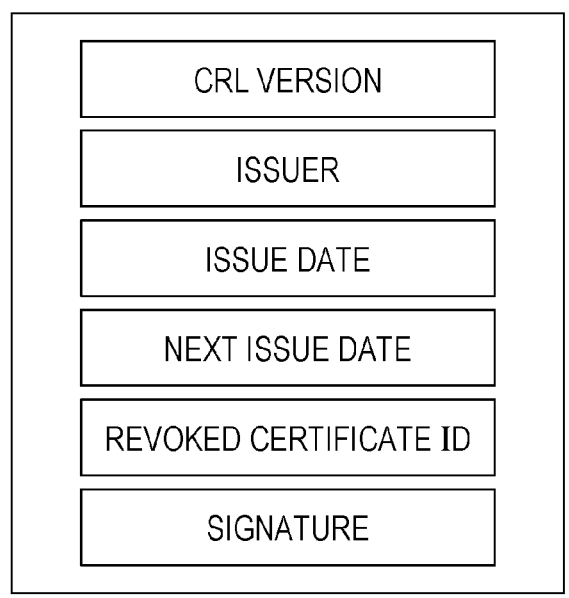
FIG. 5 is a diagram illustrating an example of a CRL according to the first embodiment.

The authentication information storage unit 104 stores a key pair of secret key and public key certificate, and the CRL. The secret key, public key certificate, and CRL are embedded in the authentication information storage unit 104 when shipping. FIG. 4 is a diagram illustrating an example of the configuration of a public key certificate. The public key certificate is configured including version, issuer, start and end of validity period, certificate ID, and signature of the portal server, which is the certificate authority. FIG. 5 is a diagram illustrating an example of the configuration of a CRL. The CRL is configured including CRL version, issuer, issue date, next issue date, revoked certificate ID, and signature of the portal server, which is the certificate authority. The certificate ID is not restricted to being one; multiple certificate IDs may be included.

The communication unit 105 communicates with the device 200, manufacturer server 300a, and service server 300b. The communication unit 105 communicates with the server via Secure Socket Layer (SSL) communication. Certificates necessary for SSL communication are recorded at the communication unit 105.

1.3 Configuration of Device 200

Figure 6:
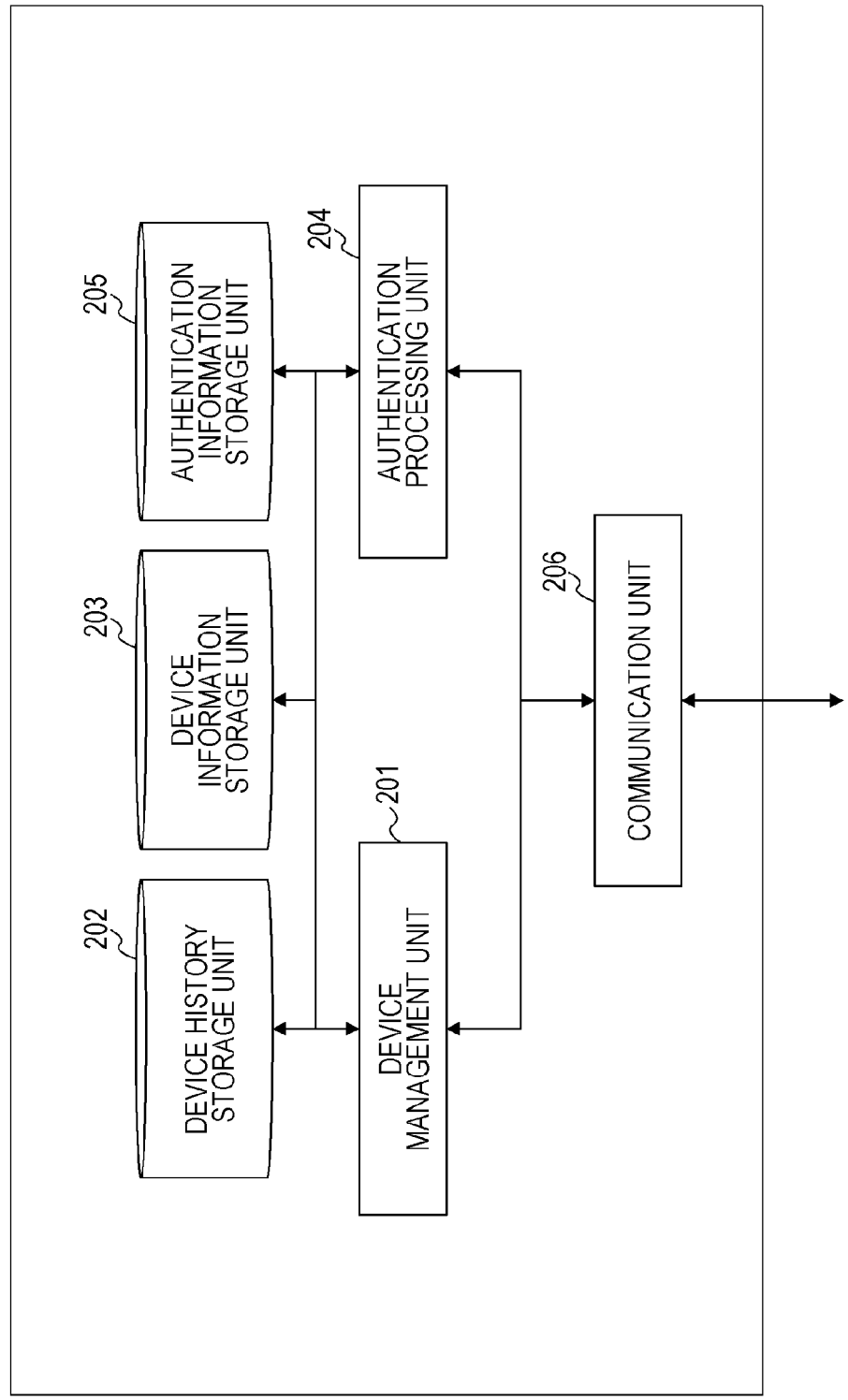
FIG. 6 is a configuration diagram of a device according to the first embodiment.

FIG. 6 is a configuration diagram of the device 200. The device 200 includes a device management unit 201, a device history storage unit 202, a device information storage unit 203, an authentication processing unit 204, an authentication information storage unit 205, and a communication unit 206.

The device management unit 201 transmits a connection request to the controller 100 when starting up. In a case of connecting to the content server 300c instead of connecting to the controller, the communication unit 206 performs SSL communication with the content server 300c. The device management unit 201 transmits an authentication request to the authentication processing unit 204 upon receiving a public key certificate from the controller. The device management unit 201 receives the results of authentication from the authentication processing unit 204. In a case where authentication is successful, the device management unit 201 registers the controller ID and certificate ID in a connecting controller management table stored at the device information storage unit 203. The device management unit 201 also periodically or non-periodically transmits device history recorded at the device history storage unit 202 to the server via the controller. Note that in a case where direct connection has been made to the content server, transmission is made to the server without going through the controller.

The device history storage unit 202 acquires and records operation history of the device.

The device information storage unit 203 manages information of the controller 100 connecting to the device. FIG. 7 is a diagram illustrating an example of a connecting controller management table which the device information storage unit 203 stores. The connecting controller management table records controller IDs and certificate IDs of the public key certificates which the controllers store.

The authentication processing unit 204 performs authentication processing with the controller. Also, upon receiving an authentication request from the device management unit 201 along with a public key certificate, the authentication processing unit 204 acquires the CRL recorded in the authentication information storage unit 205, and verifies whether the certificate ID of the public key certificate of the controller is recorded in the CRL. The authentication processing unit 204 also verifies the signature of the public key certificate using the public key (omitted from illustration) of the portal server, which is the certificate authority. The authentication processing unit 204 also generates a random number and transmits the random number to the controller. The authentication processing unit 204 verifies a signature of the random number received from the controller. In a case where any one of the verifications fails, the authentication processing unit 204 determines that the controller is an unauthorized device.

The authentication information storage unit 205 stores a key pair of secret key and public key certificate, and the CRL. The key pair of the secret key and public key certificate, and the CRL are embedded in the authentication information storage unit 205 when shipping the device. The public key certificate and CRL are of the same configuration as the public key certificate and CRL of the controller, so description will be omitted here.

The communication unit 206 communicates with the controller 100 and content server 300c. The communication unit 206 communicates with the content server via SSL communication. Certificates necessary for SSL communication are recorded at the communication unit 206.

1.4 Configuration of Manufacturer Server 300a

Figure 8:
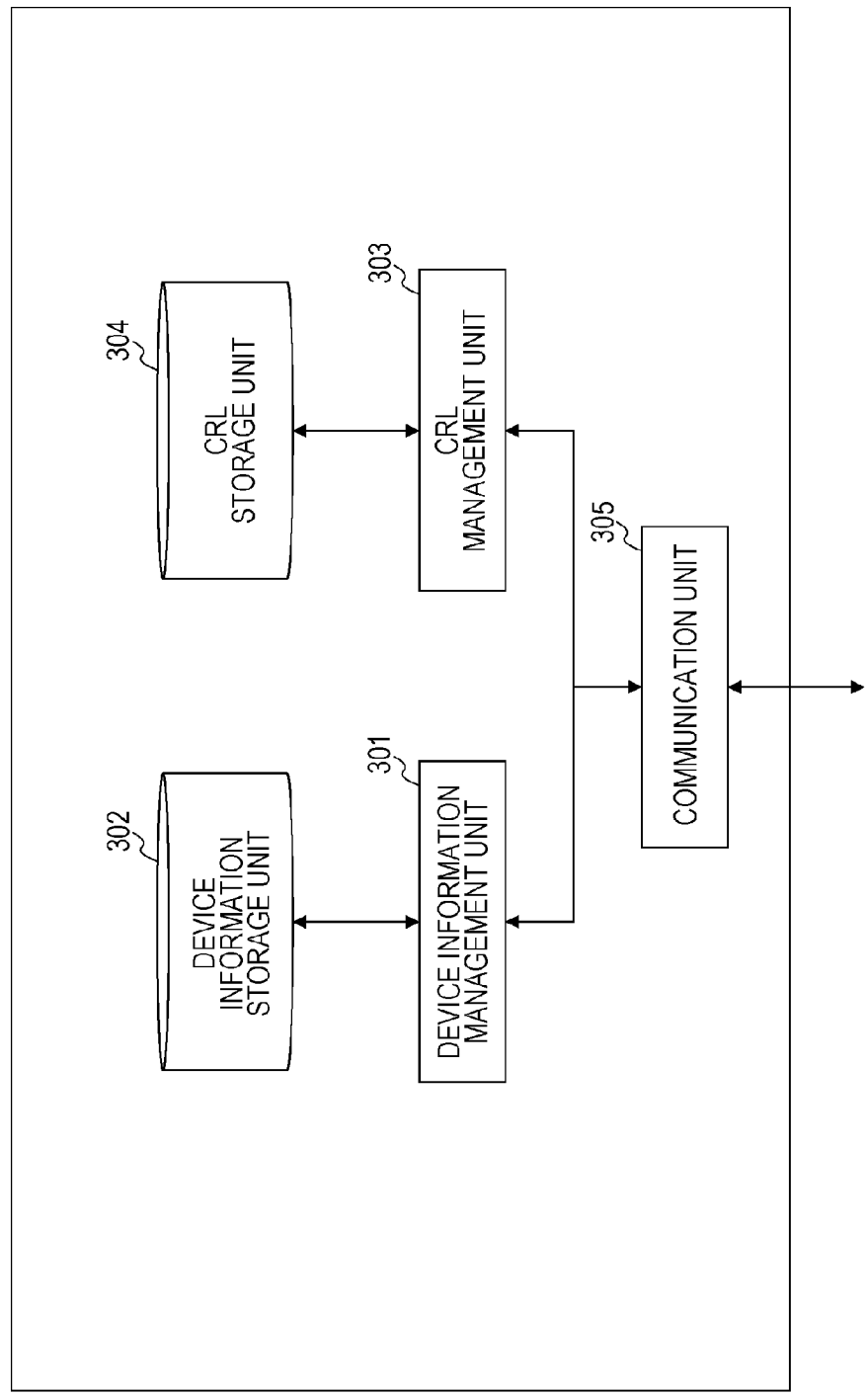
FIG. 8 is a configuration diagram of a manufacturer server according to the first embodiment.

FIG. 8 is a configuration diagram of the manufacturer server 300a. The manufacturer server 300a is configured including a device information management unit 301, a device information storage unit 302, a CRL management unit 303, a CRL storage unit 304, and a communication unit 305. The service server 300b is configured in the same way.

The device information management unit 301 controls the device information storage unit 302, and manages association between controllers and devices, IDs of controllers and devices being connected and certificate IDs of public key certificates, and device history. Also, upon having detecting an unauthorized device or controller, the device information management unit 301 notifies the portal server of the certificate ID of the public key certificate of that device or controller, and places a CRL issue request. In a case of having updated the CRL, the device information management unit 301 transmits the CRL to the CRL management unit 303.

The device information storage unit 302 records the IDs and certificate IDs of the controller and devices, and device history. FIG. 9 is a diagram illustrating an example of a device information management table that the device information storage unit 302 stores. This shows that device ID1 through device ID3 are connected to controller ID1 which is the ID of the controller. This also shows that the certificate ID of the controller and the certificate IDs of the devices also are recorded. This shows that the history information of the device ID1 is recorded in the history information 1.

The CRL management unit 303 controls the CRL storage unit 304, and upon having received a CRL from the device information management unit 301, updates the CRL of the CRL storage unit 304. The CRL storage unit 304 records CRLs.

The communication unit 305 communicates with the controller 100a and the portal server 400. Communication with the controller 100a and portal server 400 is performed via SSL communication. Certificates necessary for SSL communication are recorded in the communication unit 305.

The configuration of the content server 300c differs from that of the manufacturer server 300a. Connection is made with devices without going through the controller, so SSL authentication is performed between the content server 300c and the devices. The device information management table of the device information storage unit 302 is thus a device information management table with no controller information.

1.5 Configuration of Portal Server 400

Figure 10:
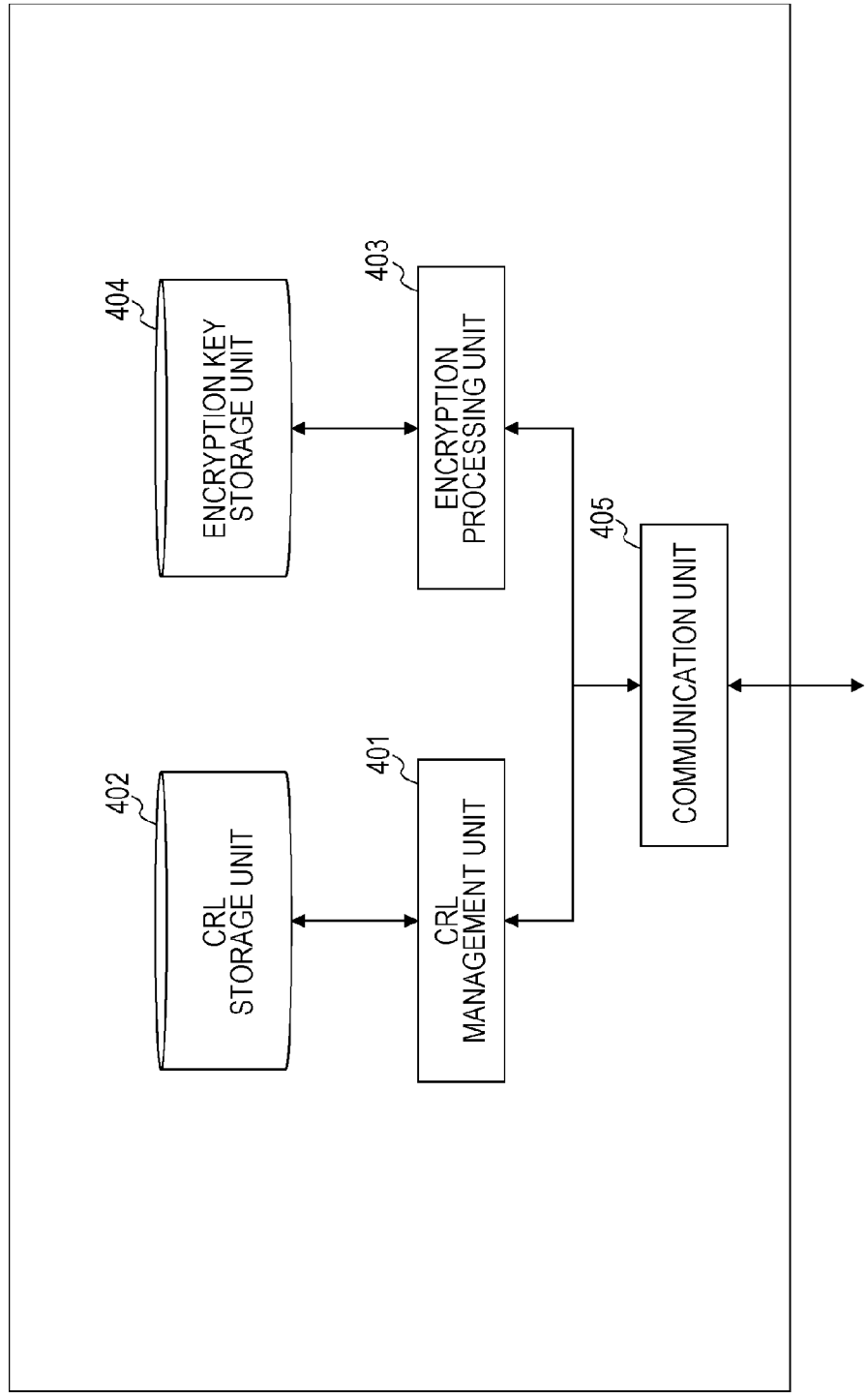
FIG. 10 is a configuration diagram of a portal server according to the first embodiment.

FIG. 10 is a configuration diagram of the portal server 400. The portal server 400 includes a CRL management unit 401, a CRL storage unit 402, an encryption processing unit 403, an encryption key storage unit 404, and a communication unit 405.

The CRL management unit 401 controls the CRL storage unit 402 to manage the CRLs. Upon receiving a CRL issue request from the manufacturer server 300a or service server 300b or the like, the CRL management unit 401 sets data other than signature in the CRL, and requests the encryption processing unit 403 to generate a CRL signature. The CRL management unit 401 receives the CRL with the generated signature from the encryption processing unit 403, and records in the CRL storage unit 402. The CRL storage unit 402 records the issued CRL.

Upon receiving a request for signature generation from the CRL management unit 401, the encryption processing unit 403 uses a secret key stored at the encryption key storage unit 404 to generate the CRL signature. Once the CRL signature is generated, the encryption processing unit 403 transmits to the CRL management unit 401.

The encryption key storage unit 404 stores the secret key for issuing a CRL for the portal server 400 which is the certificate authority.

The communication unit 405 performs communication with the servers 300*a* through *c*. The servers 300*a* through *c* perform SSL communication. Certificates necessary for SSL communication are recorded at the communication unit 405.

1.6 Operations of Authentication System 10

Operations of the authentication system 10 include the following.

(1) Device registration processing where connection is made from device to controller, and registration is made in server (2) Processing to update CRL of manufacturer server 300*a*

(3) Processing to update CRL of device

These will each be described below with reference to the drawings.

1.6.1 Operations at Time of Device Registration Processing

Figure 11:
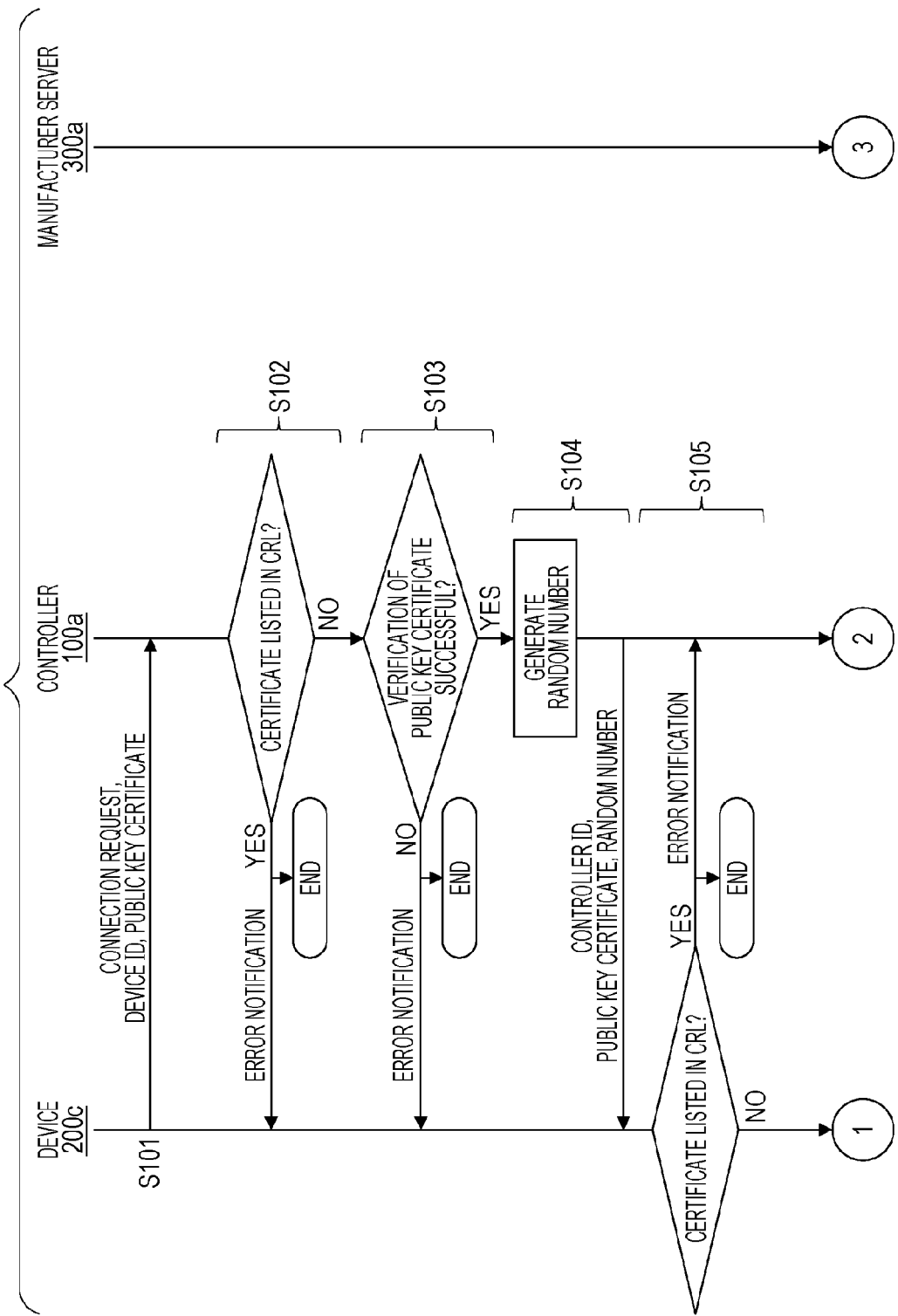
FIG. 11 is a sequence diagram for when registering a device (part 1), according to the first embodiment.
Figure 12:
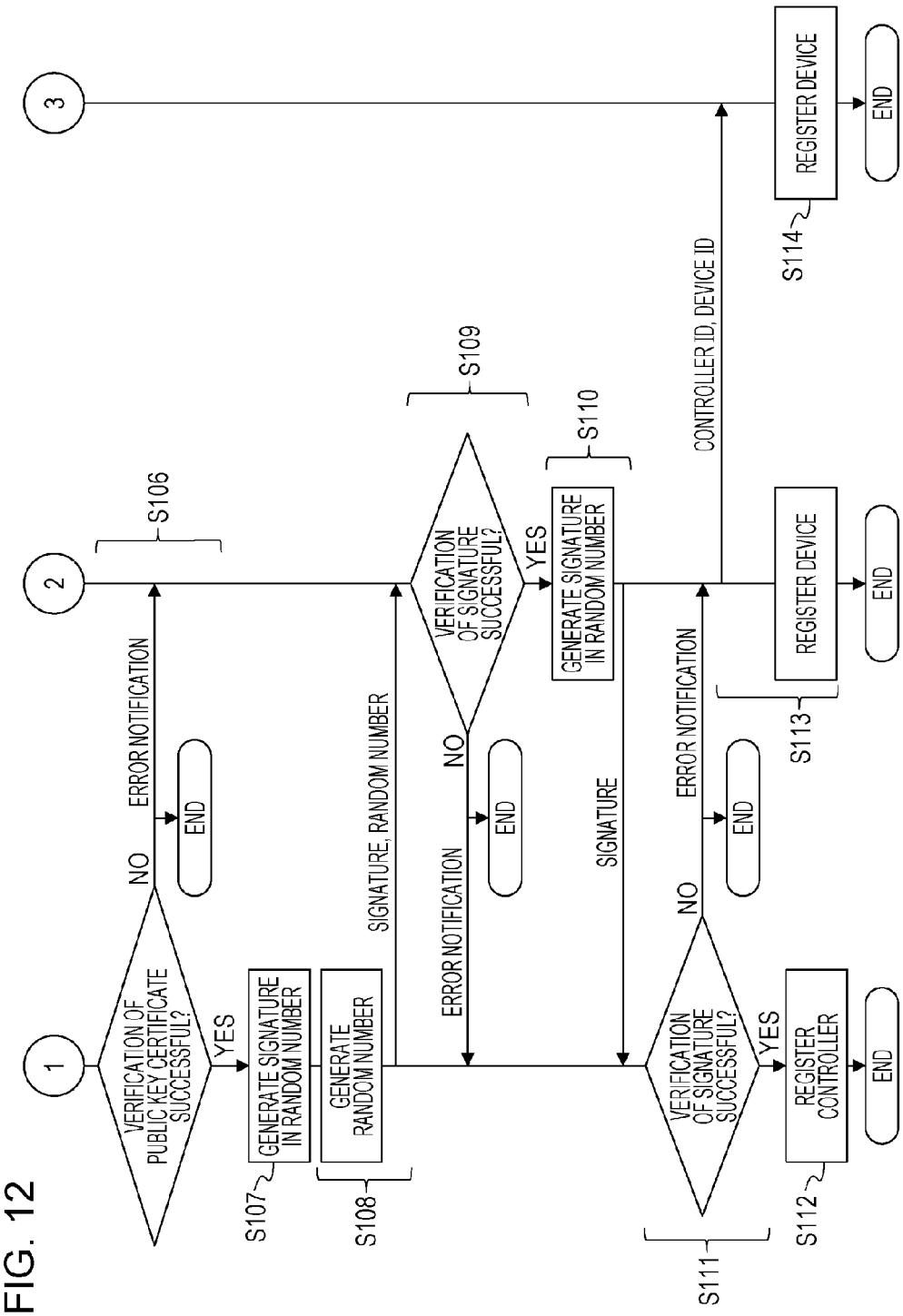
FIG. 12 is a sequence diagram for when registering a device (part 2), according to the first embodiment.

FIGS. 11 and 12 illustrate a sequence of processing where the device 200*c* connects to the controller 100*a*, and is registered to the manufacturer server 300*a*. Processing where the device 200*a* or 200*b* connect to the controller 100*a* and are registered to the manufacturer server 300*a*, and processing where the device 200*c* connects to the controller 100*b* and is registered to the service server 300*a* are the same.

(S101) A connection request is performed from the device 200*c* to the controller 100*a*. The device ID and public key certificate of the device are also transmitted at this time.

(S102) Verification is performed regarding whether or not the certificate ID of the public key certificate of the device 200*c*, regarding which the controller 100*a* has received the connection request, is listed in the CRL stored in the authentication information storage unit. If listed in the CRL, an error is notified to the device 200*c* and the processing ends.

(S103) The controller 100*a* verifies the signature of the public key certificate received from the device 200*c*. In a case where the verification is not successful, the device 200*c* is notified of an error and the processing ends. The signature at this time may be Elliptic Curve Digital Signature Algorithm (ECDSA). ECDSA is described in National Security Agency, "Suite B Implementer's Guide to FIPS 186-3 (ECDSA)", [online], Feb. 3, 2010, [Searched Jun. 24, 2014], Internet <URL: http://www.nsa.gov/ia/_files/ecdsa.pdf, and accordingly will not be described here.

(S104) The controller 100*a* generates a random number, and transmits to the device 200*c* along with the controller ID and public key certificate.

(S105) The device 200*c* verifies whether the certificate ID of the public key certificate of the controller 100*a* which has transmitted the connection request is listed in the CRL that it stores. If listed in the CRL, an error is notified to the controller 100*a* and the processing ends.

(S106) The device 200*c* verifies the signature of the public key certificate received from the controller 100*a*. In a case where verification fails, an error is notified to the controller 100*a* and the processing ends.

(S107) The device 200*c* generates a signature based on the random number received from the controller 100*a* and the secret key of the device 200*c*.

(S108) The device 200*c* generates a random number, and transmits to the controller 100*a* along with the signature generated in S107.

(S109) The controller 100*a* receives the signature and random number, and verifies the signature using the public key certificate received in S101. In a case where verification of the signature fails, an error is notified to the device 200*c* and the processing ends.

(S110) The controller 100*a* generates a signature from the random number received in S109 and the secret key of the controller 100*a*, and transmits the signature to the device 200*a*.

(S111) The device 200*c* receives the signature, and verifies the signature using the public key certificate received in S104. In a case where verification of the signature fails, an error is notified to the controller 100*a* and the processing ends.

(S112) In a case where verification in S111 is successful, the device 200*c* registers the controller in the connecting controller management table.

(S113) The controller 100*a* transmits the controller ID and certificate ID of the public key certificate, and the device ID of the device regarding which verification was successful in S109 and the certificate ID of the public key certificate, to the manufacturer server, and registers the device ID of the device and the certificate ID of the public key certificate in the connecting device management table.

(S114) Upon receiving, from the controller 100*a*, the controller ID and certificate ID of the public key certificate of the controller 100*a* and the device ID and certificate ID of the public key certificate of the device 200*c*, the manufacturer server 300*a* registers in the device information management table.

1.6.2 Operations at Time of Processing to Update CRL of Manufacturer Server 300*a*

Figure 13:
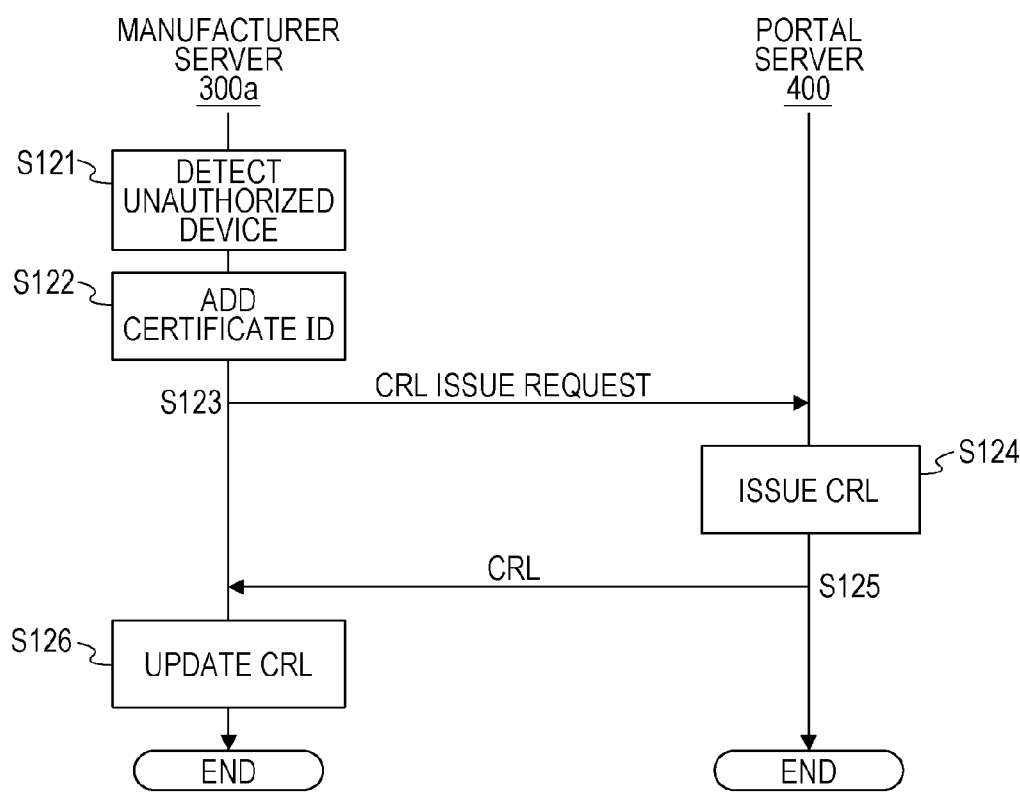
FIG. 13 is a sequence diagram for when updating a CRL of a manufacturer server, according to the first embodiment.

FIG. 13 illustrates a sequence of updating the CRL of the manufacturer server 300*a*.

(S121) The manufacturer server 300*a* detects an unauthorized device. Specific examples are a case of detecting multiple controllers connecting to the manufacturer server 300*a* with the same certificate ID, a case of detecting multiple devices of the same certificate ID registered to the manufacturer server, and so forth. Also, in a case where leakage of a secret key has been detected, a device or controller having a public key certificate corresponding thereto is also determined to be an unauthorized device.

(S122) The manufacturer server 300*a* adds the certificate ID of the unauthorized device or the unauthorized controller detected in S121, to the certificate IDs listed in the CRL.

(S123) The manufacturer server 300*a* transmits a CRL issue request along with the certificate IDs of the public key certificates of all unauthorized devices and unauthorized controllers, to the portal server 400 which is the certificate authority.

(S124) The portal server 400 issues a CRL from the received certificate IDs.

(S125) The portal server 400 transmits the CRL to the manufacturer server 300*a*.

(S126) The manufacturer server 300*a* records the received CRL in the CRL storage unit, thereby updating to the newest CRL.

The above is an example of processing of updating the CRL of the manufacturer server 300*a*, but processing for updating CRLs stored by the service server 300*b* and content server 300*c* is the same processing.

Also, even if detecting no unauthorized devices in S121, the manufacturer server 300a updates the CRL before the next issue date.

1.6.3 Operations at Time of Processing to Update CRL of Device

Figure 14:
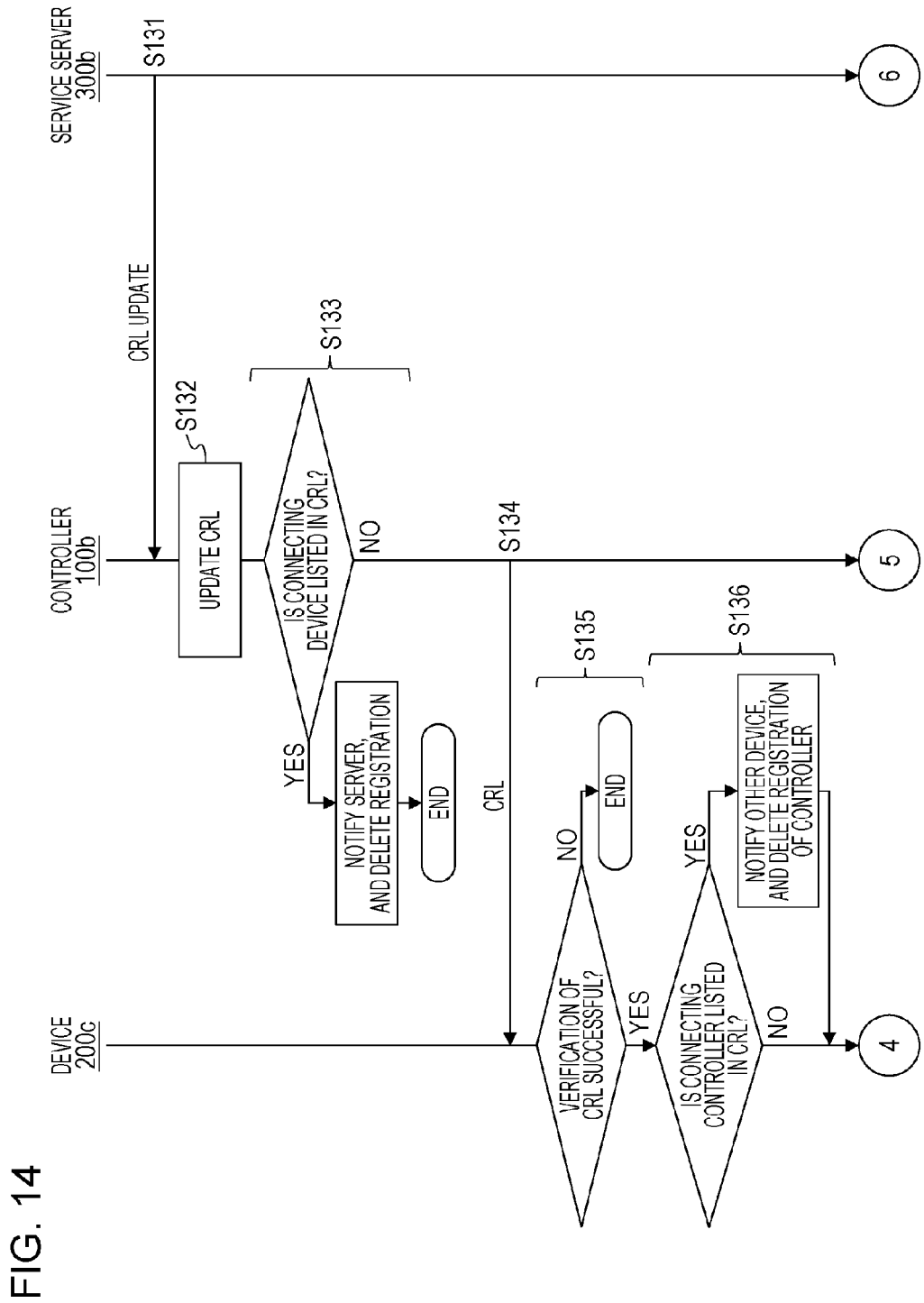
FIG. 14 is a sequence diagram for when updating a CRL of a device (part 1), according to the first embodiment.
Figure 15:
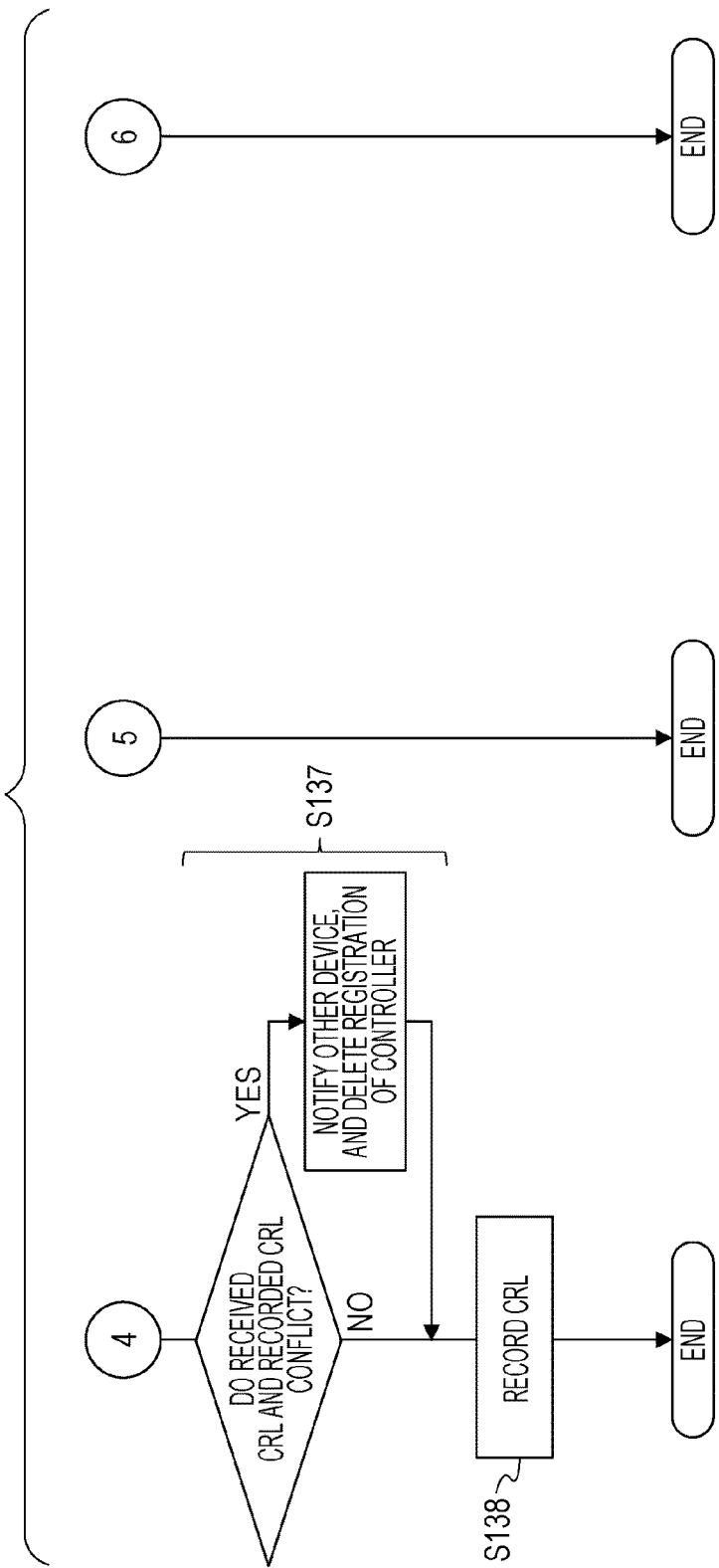
FIG. 15 is a sequence diagram for when updating a CRL of the device (part 2), according to the first embodiment.

FIGS. 14 and 15 illustrate a sequence to update the CRL of the device 200c from the controller 100b. Although an example of processing where the controller 100b updates the CRL of the device 200c will be described, the processing for updating the CRL of the device 200c from the controller 100a is the same.

(S131) After updating the CRL, the service server 300b requests the controller 100b for CRL updating processing along with the CRL.

(S132) The controller 100b updates to the CRL received from the service server 300b.

(S133) The controller 100b verifies whether a connecting device is listed in the CRL. If listed, this is notified to the service server 300b, and the registration of the listed device is deleted.

(S134) The controller 100b requests all connecting devices 200 for CRL updating processing along with the CRL. Description will be made here based on an example of requesting the device 200c to perform updating processing.

(S135) The device 200c verifies the signature of the received CRL. In a case where verification is not successful, the CRL updating processing ends.

(S136) The device 200c verifies whether or not all connecting controllers are listed in the CRL. If even one connecting controller is listed, the other devices and controllers are notified of detection of an unauthorized controller. Registration of this unauthorized controller is deleted from the connecting controller management table as well.

(S137) The device 200c compares the CRL received from the controller 100b and the CRL in the authentication information storage unit, and verifies whether or not there is inconsistency. Specifically, in a case where a CRL received from the controller 100a has been recorded, comparison is made between the issue date of the CRL received from the controller 100b and the next issue date of the CRL received from the controller 100a. In a case where the next issue date of the CRL received from the controller 100a is before the issue date of the CRL received from the controller 100b, determination is made that the next issue date of the CRL received from the controller 100a has passed, so the controller 100a is detected as an unauthorized controller since it did not update the CRL. Also, the versions of the CRLs received from the controller 100a and the controller 100b are compared, and if the CRL version does not match, the controller which transmitted the older version CRL is detected as an unauthorized controller since it did not update the CRL. At this time, the device 200c notifies the other devices and controllers of detection of an unauthorized controller. Registration of this unauthorized controller is deleted from the connecting controller management table as well. Connection with the controller 100a is also cut off.

(S138) The device 200c records the received CRL in the authentication information storage unit.

Figure 16:
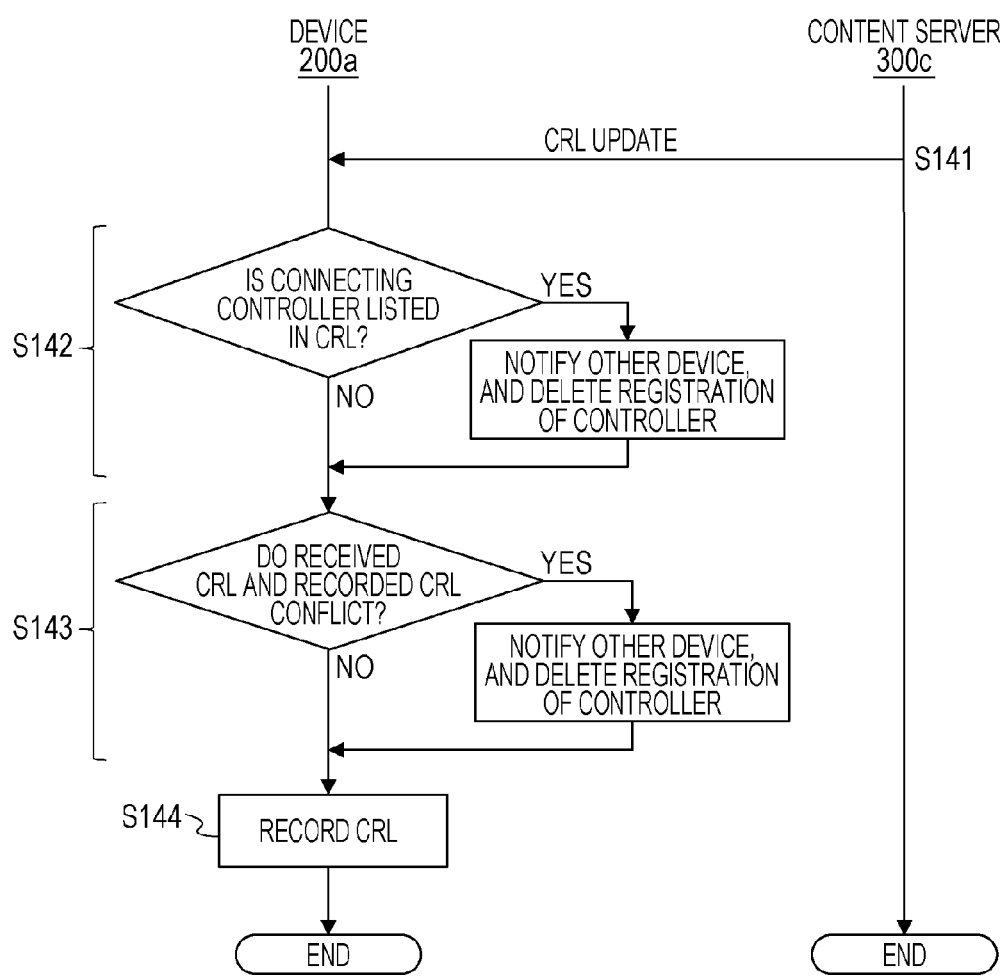
FIG. 16 is a sequence diagram for when updating a CRL of the device, according to the first embodiment.

FIG. 16 illustrates a sequence of the content server 300c updating the CRL of the device 200c.

(S141) After updating the CRL, the content server 300c requests the device 200a for CRL updating processing along with the CRL.

(S142) The device 200c verifies whether or not all connecting controllers are listed in the CRL. If even one connecting controller is listed, the other devices, controllers, and content server 300c are notified of detection of an unauthorized controller. Registration of this unauthorized controller is deleted from the connecting controller management table as well.

(S143) is the same as the processing S137 and thus will be omitted.

(S144) is the same as the processing S138 and thus will be omitted.

1.7 Advantages of First Embodiment

A device which connects to one controller could not update the CRL if this controller is an unauthorized controller. In the first embodiment, the device receives CRLs from multiple controllers. Thus, the CRL can be acquired via multiple networks, and updating can be performed. Enabling updating of the CRL enables connection to unauthorized controllers to be prevented, and safe connection to be realized among authorized controllers and devices.

Second Embodiment

2. System Configuration

An authentication system 11 according to the present disclosure will be described here as an embodiment of the present disclosure, with reference to the drawings. In the authentication system 11 according to a second embodiment, an encryption key of communication is shared between the controller and device after authentication, and history information of the device is transmitted to the server by encrypted communication.

2.1 Overall Configuration of Authentication System 11

The overall configuration of the authentication system 11 according to the second embodiment is the same as in the first embodiment, and accordingly will be omitted here. Components having the same configuration as those in the first embodiment are denoted by the same reference numerals, and description will be omitted.

2.2 Operations of Authentication System 11

Operations of the authentication system 11 include the following.

(1) Device registration processing where connection is made from device to controller, and registration is made in server (2) Processing to update CRL of manufacturer server 300a (3) Processing to update CRL of device (4) Processing to transmit device history information from device to server The processing of (2) and (3) is the same as in the first embodiment, so description will be omitted here. Description will otherwise be made below with reference to the drawings.

2.2.1 Operations at Time of Device Registration Processing

Figure 17:
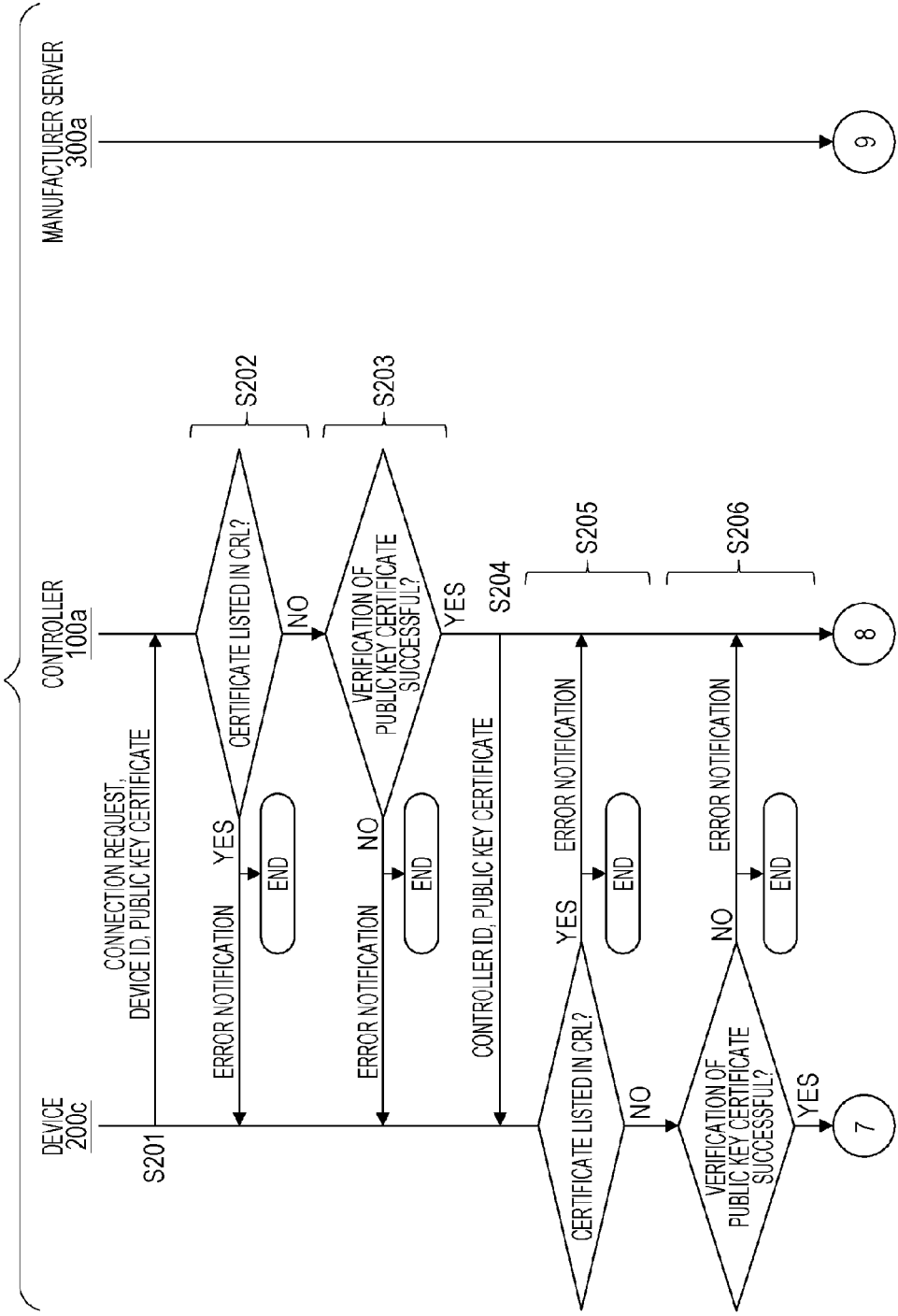
FIG. 17 is a sequence diagram for when registering a device (part 1), according to a second embodiment.
Figure 18:
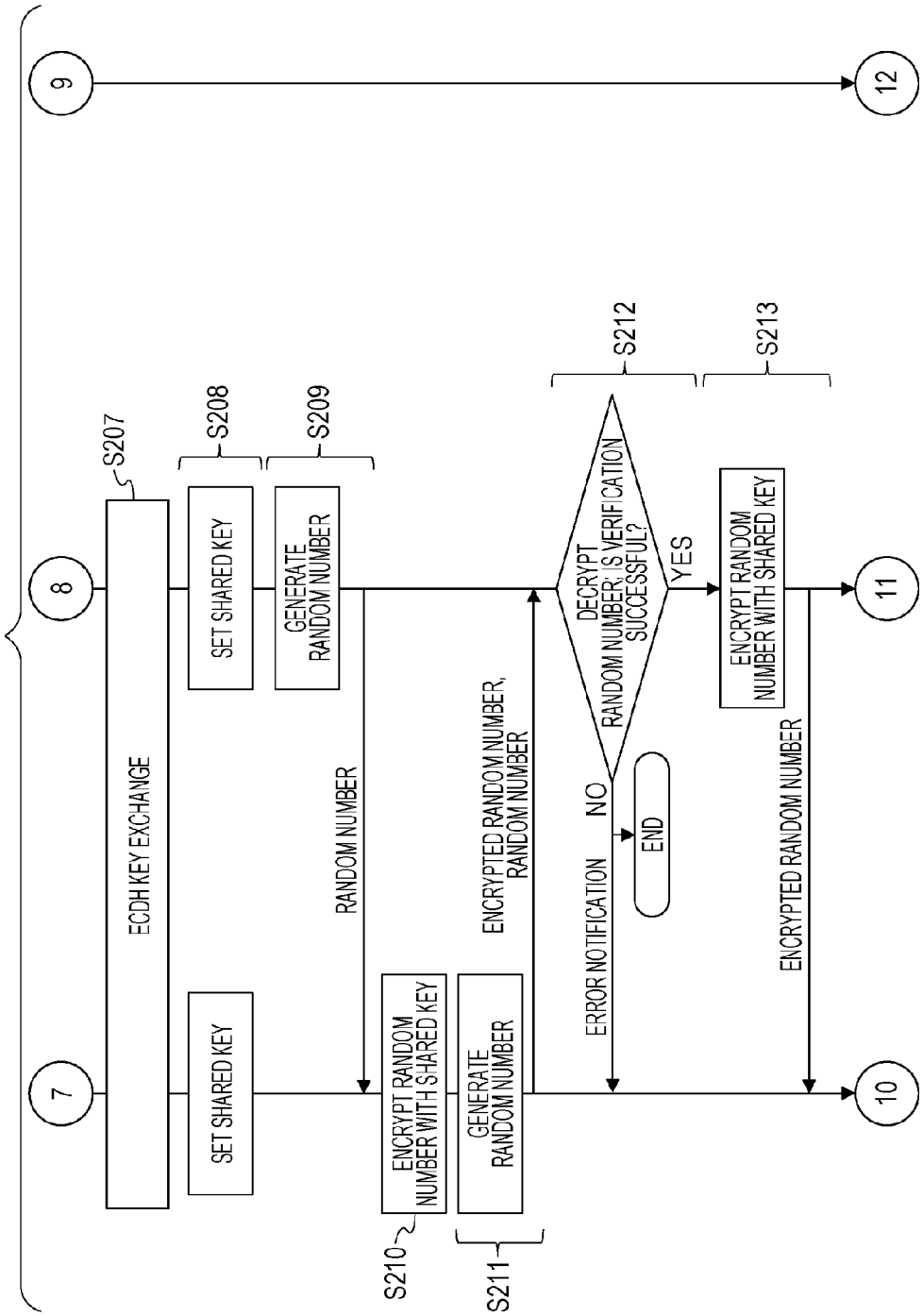
FIG. 18 is a sequence diagram for when registering the device (part 2), according to the second embodiment.
Figure 19:
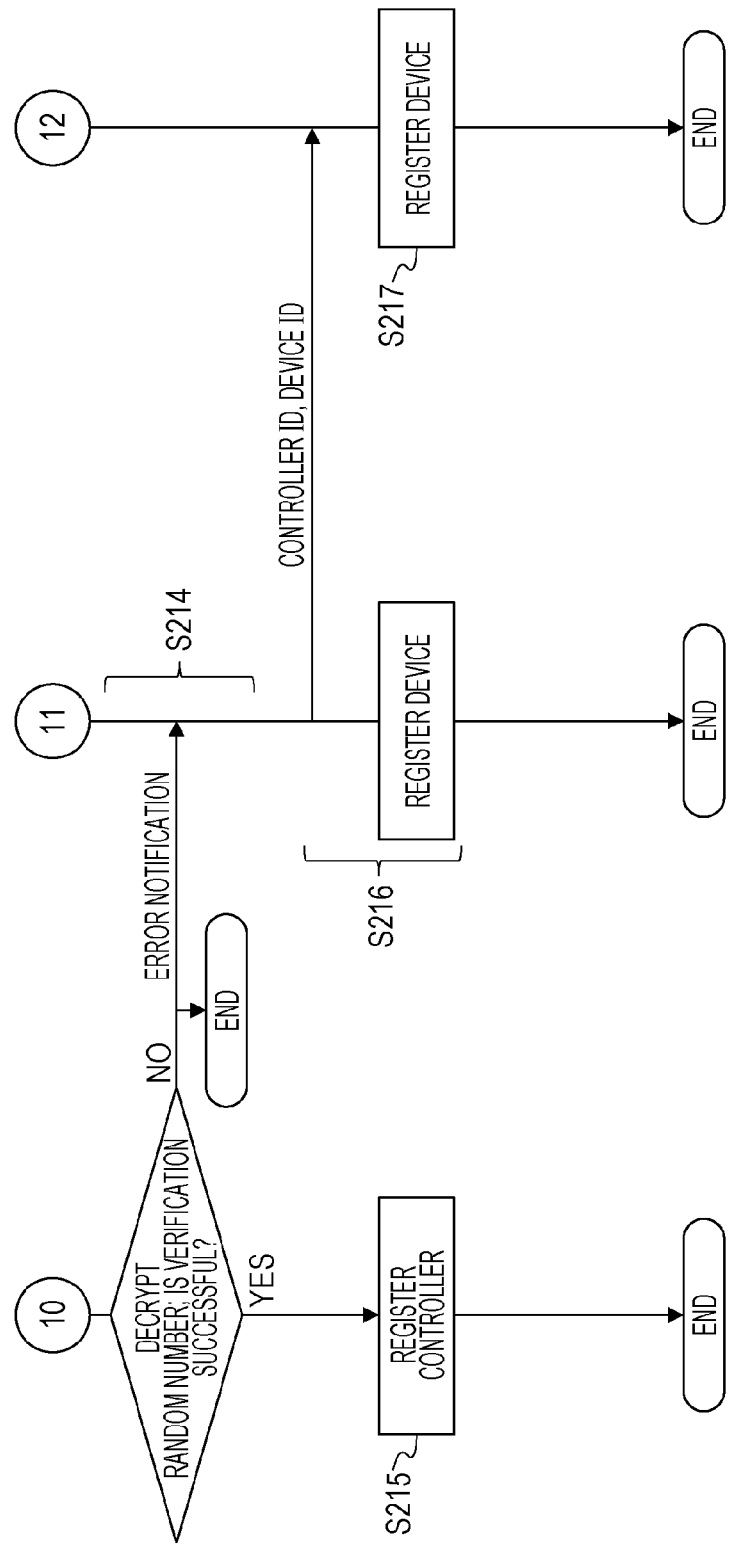
FIG. 19 is a sequence diagram for when registering the device (part 3), according to the second embodiment.

FIGS. 17 through 19 illustrate a sequence of processing where the device 200c connects to the controller 100a, and is registered to the manufacturer server. Processing where the device 200a or 200b connect to the controller 100a and are registered to the manufacturer server 300a, and processing where the device 200c connects to the controller 100b, and is registered to the service server, are the same.

The processing in (S201) through (S203) is the same as the processing in S101 through S103 in the first embodiment, so description will be omitted here.

(S204) The controller 100a transmits the controller ID and public key certificate to the device 200c.

The processing in (S205) through (S206) is the same as the processing in S105 through S106 in the first embodiment, so description will be omitted here.

(S207) The device 200c and controller 100a exchange keys. Elliptic Curve Diffie-Hellman (ECDH), which is an elliptic curve cryptography key exchange method is used here. ECDH is described in Elaine Barker, three others, NIST Special Publication 800-56A Revision 2, "Recommendation for Pair-Wise Key-Establishment Schemes Using Discrete Logarithm Cryptography", [online], May 13, 2013, National Institute of Standards and Technology, [Searched Jun. 24, 2014], Internet <URL: http://nvlpubs.nist.gov/nistpubs/SpecialPublications/NIST.SP.800-56Ar2.pdf>, and accordingly will not be described here.

(S208) The device 200c and controller 100a set the key shared in the key exchange as a shared key.

(S209) The controller 100a generates a random number, and transmits to the device 200c.

(S210) The device 200c receives the random number from the controller 100a, and encrypts using the shared key.

(S211) The device 200c generates a random number, and transmits to the controller 100a along with the encrypted random number generated in S209.

(S212) The controller 100a receives the encrypted random number and the random number, decrypts the encrypted random number using the shared key, and verifies whether it matches the random number generated in S209. In a case where verification fails, an error is notified to the device 200c and the processing ends.

(S213) In a case where verification is successful in S212, the controller 100a uses the shared key to encrypt the random number received in S212, and transmits the encrypted random number to the device 200c.

(S214) The device 200c receives the encrypted random number, decrypts the encrypted random number using the shared key, and verifies whether it matches the random number generated in S211. In a case where verification fails, an error is notified to the controller 100a and the processing ends.

(S215) In a case where verification is successful in S214, the device 200c registers the controller 100a in the connecting controller management table. FIG. 20 is a connecting controller management table according to the second embodiment, configured including the shared key shared with the controller, in addition to the connecting controller management table according to the first embodiment.

(S216) The controller 100a transmits the controller ID and certificate ID of the public key certificate, and the device ID of the device regarding which verification was successful in S212 and the certificate ID of the public key certificate, to the manufacturer server 300a, and registers the device ID of the device and the certificate ID of the public key certificate in the connecting device management table. FIG. 21 is a connecting device management table according to the second embodiment, configured including the shared key shared with the device, in addition to the connecting device management table according to the first embodiment.

The processing in (S217) is the same as the processing in S114 in the first embodiment, so description will be omitted here.

Figure 22:
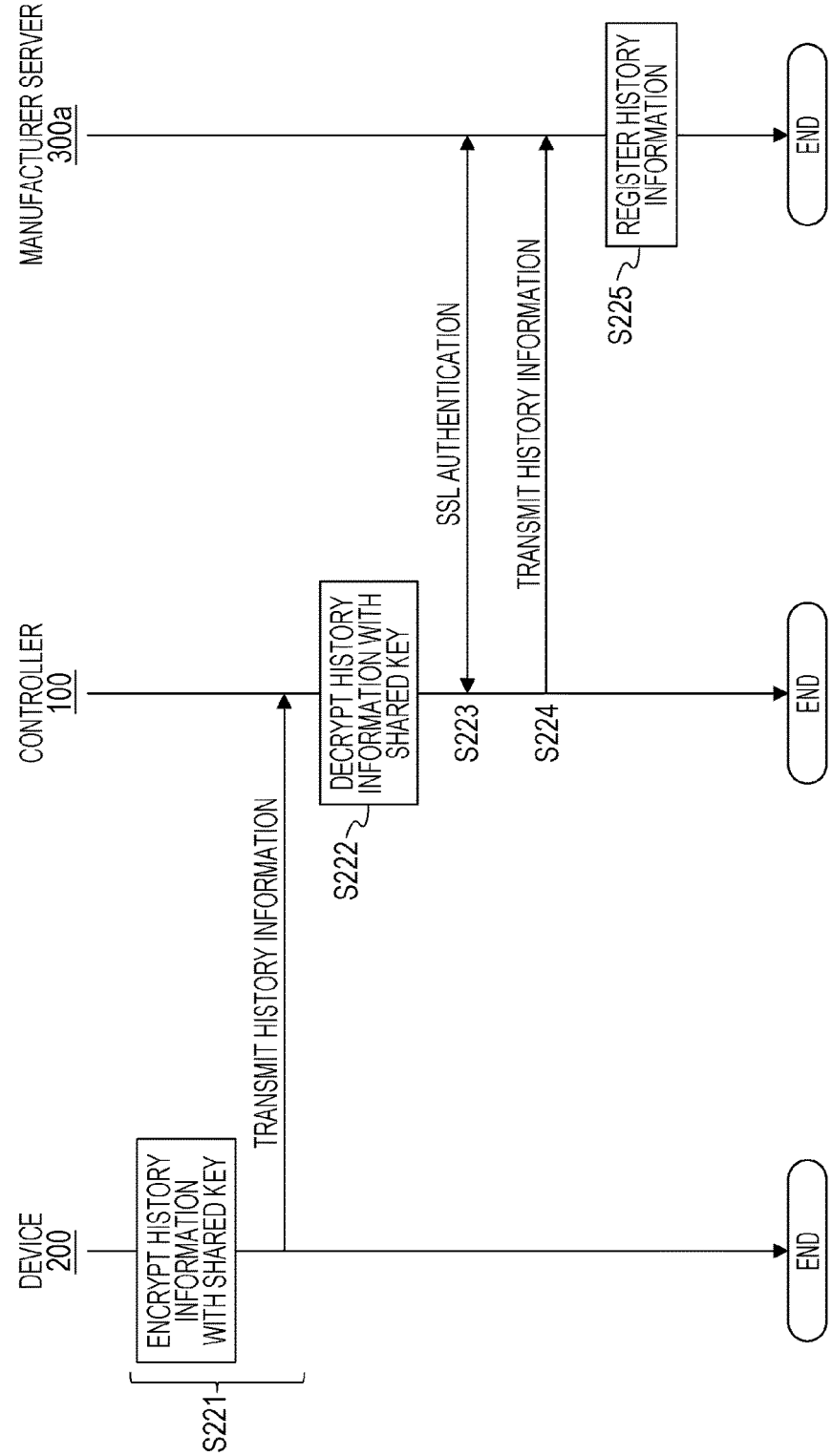
FIG. 22 is a sequence diagram for when performing transmission processing of device history information according to the second embodiment.

2.2.2 Operations Processing for Transmitting Device History Information from Device to Manufacturer Server 300a FIG. 22 illustrates a sequence of transmitting device history information from the device to the manufacturer server 300a. This uploading is performed periodically or non-periodically.

(S221) The device encrypts accumulated device history information using the shared key, and transmits to the controller along with the device ID.

(S222) The controller receives the device ID and encrypted device history information, searches for the shared key based on the device ID, and decrypts the device history information using the shared key.

(S223) The controller and manufacturer server 300a perform SSL authentication, and establish an encrypted communication path.

(S224) The controller transmits the controller ID and device ID received from the device and the device history information to the manufacturer server 300a.

(S225) The manufacturer server 300a registers the received controller ID, device ID, and device history information.

2.3 Advantages of Second Embodiment

Key exchange is performed when authenticating the device, and the shared key is used for challenge-response authentication in the first embodiment. The shared key can be generated from just the public key corresponding to the secret key, so in a case where the secret key corresponding to the public key of the public key certificate is not stored, the shared key cannot be generated, and challenge-response authentication will fail. Accordingly, authentication processing can be reduced as compared to authentication processing where signature generation using the secret key and signature verification using the public key are performed. Encrypted communication of the device history information can be performed by the shared key, so leakage of device history information can be prevented.

Third Embodiment

In the first embodiment of the present disclosure, devices are capable of acquiring CRLs via multiple networks and updating to new CRLs, by receiving CRLs from multiple controllers. In a third embodiment, a configuration will be described regarding a configuration where devices can update to new CRLs even in a case where there is one controller (see FIG. 23) or the controller is not connected to a network (FIG. 24). An authentication system according to the third embodiment of the present disclosure will be described below.

3. System Configuration

The authentication system 10 will be described here as a third embodiment of the present disclosure, with reference to the drawings. Components that are the same as in the first embodiment of the present disclosure are denoted by the same reference numerals, and description will be omitted.

3.1 Overall Configuration of Authentication System 10

Figure 23:
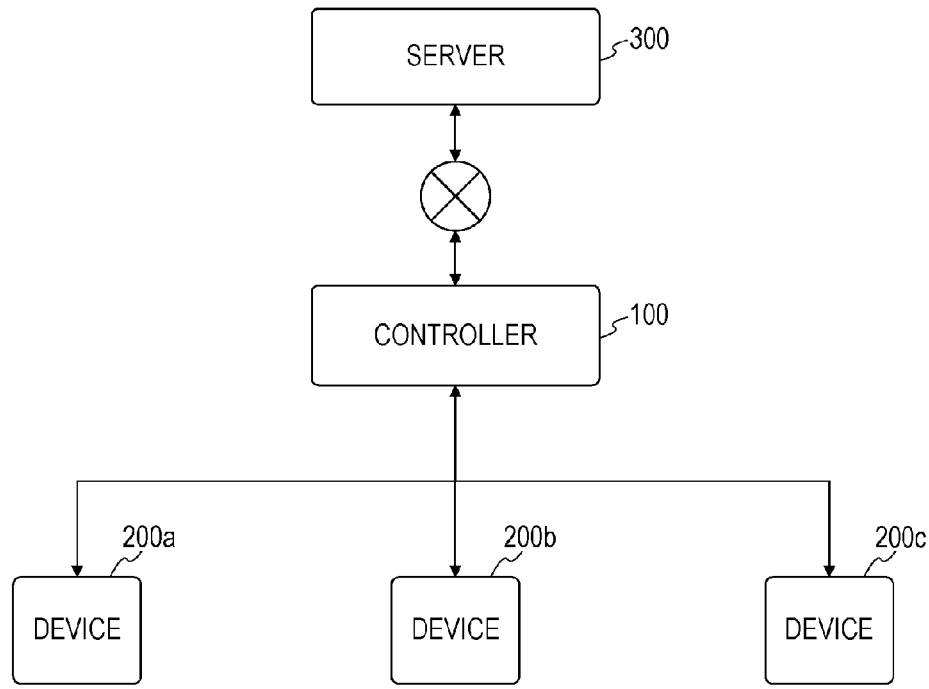
FIG. 23 is an overall configuration diagram of an authentication system according to a third embodiment.
Figure 24:
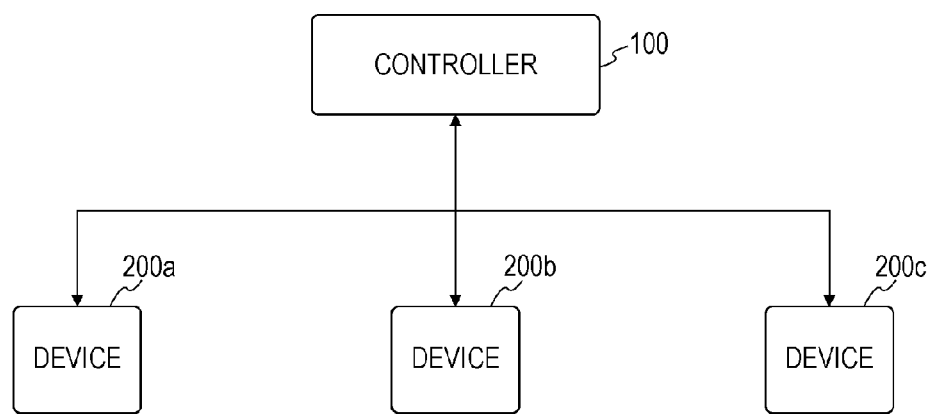
FIG. 24 is an overall configuration diagram of the authentication system according to the third embodiment.

FIG. 23 is a diagram illustrating the coverall configuration of the authentication system 10 according to the third embodiment of the present disclosure. The authentication system 10 includes the controller 100 devices 200a, 200b, and 200c, and the server 300. In the authentication system 10 according to the third embodiment of the present disclosure, the number of the controller 100 is one, and the number of the server 300 connecting to the controller 100 is also one. Other than connecting to each other, the devices 200*a* through *c* are connected to the single controller 100. A specific example is the same as in the first embodiment, so description will be omitted.

Although description has been made that the authentication system 10 according to the third embodiment of the present disclosure has the controller 100 and server 300 connected, this is not restrictive, and an arrangement may be made such as illustrated in FIG. 24 where the controller 100 and server 300 are not connected. That is to say, an arrangement may be made where the controller 100 is only connected to the devices 200*a* through *c*. In the following description, whether or not the controller 100 is connected to the server 300 is not restricted, unless stated in particular.

3.2 Addition of Device to Authentication System 10

Figure 25:
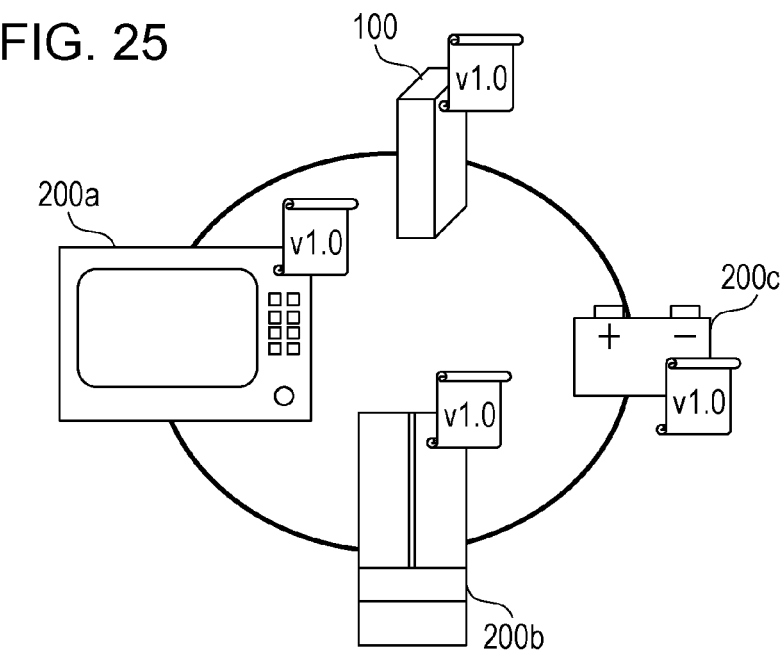
FIG. 25 is an outline diagram of the authentication system according to the third embodiment.
Figure 26:
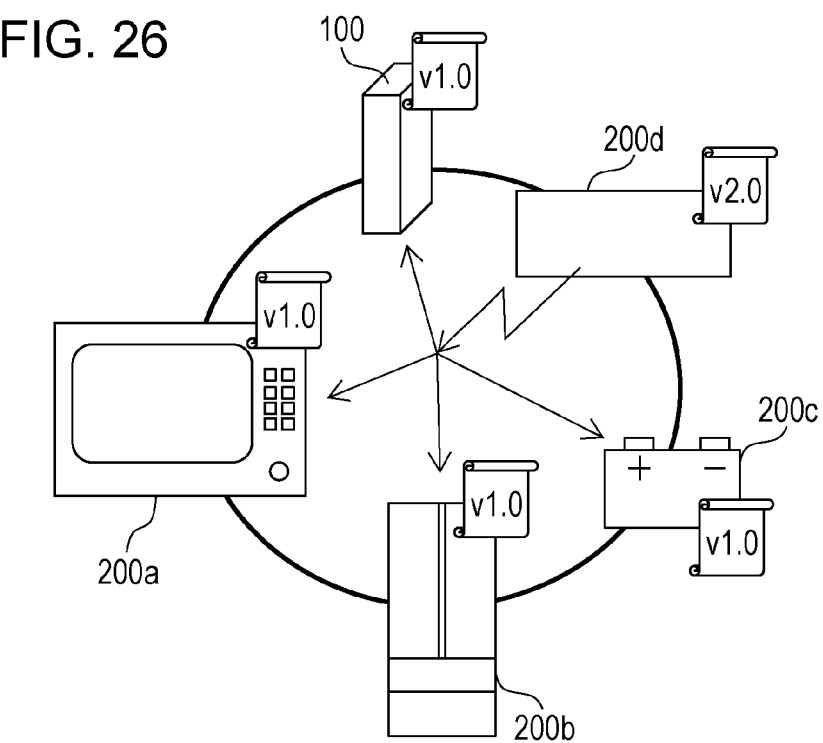
FIG. 26 is an outline diagram of the authentication system according to the third embodiment.
Figure 27:
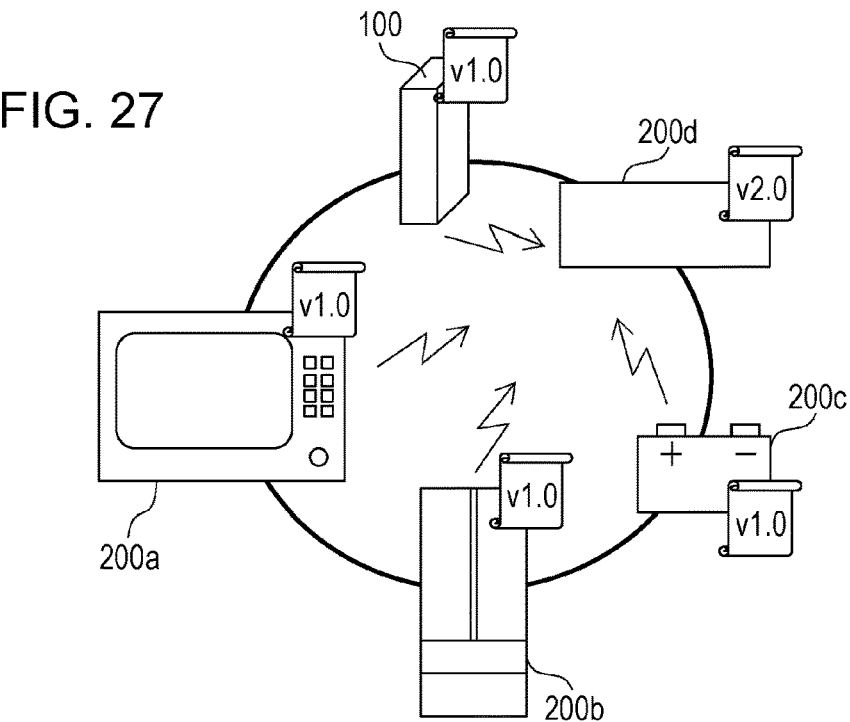
FIG. 27 is an outline diagram of the authentication system according to the third embodiment.

FIGS. 25 through 28 are diagrams schematically illustrating operations in a case of having added a device to the authentication system 10. In FIGS. 25 through 27, the controller 100, devices 200*a* through *c*, and a device 200*d* are connected to each other, and can communicate with each other. The circle drawn in the background does not indicate the relationship in connection, but rather means that devices on this circle are participating in the authentication system 10. Registering a device with the controller 100 enables the registered device to participate in the authentication system 10.

Figure 28:
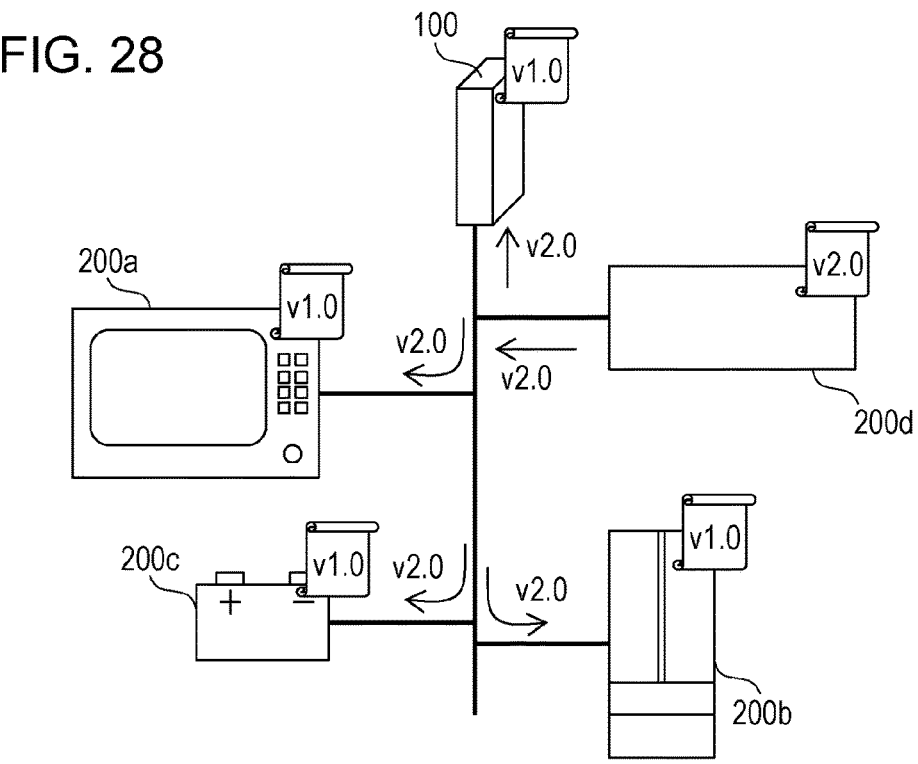
FIG. 28 is a connection diagram of the authentication system according to the third embodiment.

The connectional relationship of the controller 100, devices 200*a* through *c*, and device 200*d*, is illustrated in FIG. 28. FIG. 28 exemplarily illustrates a case where the controller 100, devices 200*a* through *c*, and device 200*d*, are connected by cable. Although a case of connection by cable is exemplarily illustrated, this is not restrictive, and wireless connection may be made.

FIG. 25 schematically illustrates a state before the device 200*d* is added to the authentication system 10. In FIG. 25, the authentication system 10 includes the controller 100 and devices 200*a* through *c*. The controller 100 and devices 200*a* through *c* each have individual CRLs. In FIG. 25, all of the controller 100 and devices 200*a* through *c* have CRLs with CRL version v1.0. Although description has been made that the controller 100 and devices 200*a* through *c* have CRLs of the same CRL version, this is not restrictive, and the controller 100 and devices 200*a* through *c* may have CRLs of different CRL versions.

FIG. 26 schematically illustrates a state where the device 200*d* is added to the authentication system 10 illustrated in FIG. 25. In FIG. 26, the device 200*d* added to the authentication system 10 stores a CRL of which the CRL version is v2.0, which is newer than the CRLs stored by the controller 100 and devices 200*a* through *c*. Upon recognizing that it has been added to the authentication system 10, the device 200*d* notifies the controller 100 and the devices 200*a* through *c* included in the authentication system 10 of its own CRL version that it stores. The controller 100 and devices 200*a* through *c* receive the CRL version notified by the device 200*d* that has been added.

In an actual connection, upon the CRL version being transmitted from the device 200*d*, the CRL version is notified to all devices (controller 100 and devices 200*a* through *c*) connected thereto, as illustrated in FIG. 28. As a method for transmitting to all devices included in the authentication system 10, there are methods called the broadcast and multicast methods, such as that in D. Forsberg, four others, RFC5191, "Protocol for Carrying Authentication for Network Access (PANA)", [online], May 2008, Internet Engineering Task Force, [Searched Jun. 24, 2014], Internet <URL: http://www.rfc-editor.org/rfc/pdfrfc/rfc5191.txt.pdf>.

FIG. 27 schematically illustrates the operations after the controller 100 and devices 200*a* through *c* have received the CRL version. In FIG. 27, the controller 100 and devices 200*a* through *c* that have received the CRL version from the device 200*d* each compare the CRL version received from the device 200*d* with the CRL version of the CRL they each store, and each notify the comparison results to the device 200*d*. Thereafter, the controller 100 or devices 200*a* through *c* that have an older CRL version than the added device 200*d* acquire a new CRL from the device 200*d*, thereby updating their own CRLs to new CRLs.

By performing processing such as described above, the controller 100 and devices 200*a* through *c* can know the existence of a new CRL and update their CRLs, even if the controller 100 is not connected to the server 300. Also, in a case where the controller 100 is connected to the server 300 but the controller 100 is an unauthorized controller and does not transmit new CRLs to the devices 200*a* through *c*, the devices 200*a* through *c* can know the existence of a new CRL from the new home appliance device 200*d* and update their CRLs. Accordingly, connection to an unauthorized controller can be prevented, and a safe connection between an authorized control and authorized devices can be continued.

3.3 Configuration of Device 200

Figure 29:
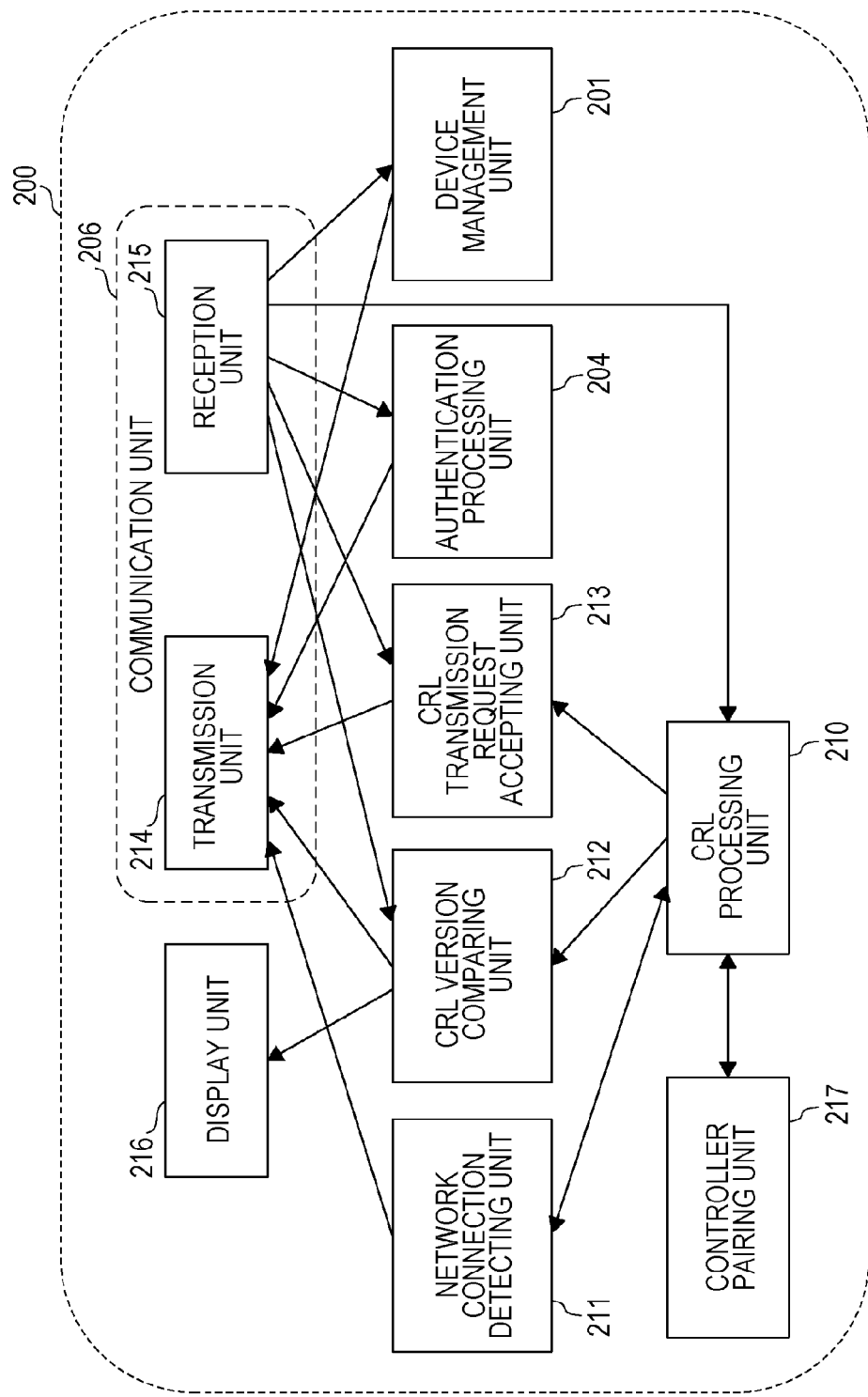
FIG. 29 is an overall configuration diagram of the devices in the third embodiment.

FIG. 29 is a configuration diagram of a device 200 according to the third embodiment of the present disclosure. In FIG. 29, the device 200 includes a device management unit 201, an authentication processing unit 204, a communication unit 206, a CRL processing unit 210, a network connection detecting unit 211, a CRL version comparing unit 212, a CRL transmission request accepting unit 213, a transmission unit 214, a reception unit 215, a display unit 216, and a controller pairing unit 217. Although omitted from illustration, also included are the device history storage unit 202, the device information storage unit 203, and the authentication information storage unit 205, in the same way as in FIG. 6. The device management unit 201, device history storage unit 202, device information storage unit 203, authentication processing unit 204, and authentication information storage unit 205 are the same as in the first embodiment of the present disclosure.

the communication unit 206 includes the transmission unit 214 and reception unit 215, and performs communication with the controller 100 and other devices 200. The transmission unit 214 accepts transmission requests from the components of the device 200, and transmits information to appropriate destinations. The reception unit 215 receives information from the controller 100 and other devices 200, and transmits information to appropriate components of the device 200.

The CRL processing unit 210 stores a CRL, and in response to requests from other components, provides the CRL version or the CRL itself to the components making the requests. The CRL processing unit 210 also performs updating processing of the CRL stored therein.

The network connection detecting unit 211 detects that a device 200 has been added to the authentication system 10, and is in a communicable state with the controller 100 and other devices. For example, in the case of Ethernet (a registered trademark) using cables, the network connection detecting unit 211 detects that a communicable state has been achieved when a cable is connected to the device 200, initial settings such as IP address settings and the like are completed, and a communicable state with the controller 100 and other devices connected to the same network is achieved. In the same way, in the case of a wireless local area network (LAN), the network connection detecting unit 211 detects that a communicable state has been achieved when communication with an access point of the wireless LAN is established, initial settings such as address settings are completed, and a communicable state with the controller 100 and other devices connected to the same network is achieved.

Also, in the case of Wi-Fi, Specified Low Power Radio, Bluetooth (a registered trademark), and Zigbee (a registered trademark), the network connection detecting unit 211 detects that a communicable state has been achieved when communication with an access point is established, initial settings such as address settings are completed, and a communicable state with the controller 100 and other devices connected to the same network is achieved. Note that Specified Low Power Radio is a simple wireless communication system in Japan that uses faint radio waves and does not require a license. Other similar systems include Family Radio Service (FRS) of the USA and Personal Mobile Radio, 446 Mhz (PMR446) of Europe, and so forth.

After having detected that the device 200 is in a communicable state, the network connection detecting unit 211 acquires the CRL version that the CRL processing unit 210 currently stores, from the CRL processing unit 210. After having acquired the CRL version, the network connection detecting unit 211 uses the transmission unit 214 to notify the controller 100 and other devices 200 included in the authentication system 10 of the CRL version.

When the device 200 receives a CRL version from another device, the CRL version comparing unit 212 compares the received CRL version with the CRL version of the CRL stored in the CRL processing unit 210 of the device 200 itself. The reception unit 215 receives CRL versions from other devices, while the CRL version of the device 200 itself is acquired from the CRL processing unit 210. The CRL version comparing unit 212 notifies the CRL version to the device that has made notification of the CRL version. The comparison results are expressed in terms of whether the CRL version of the own CRL is newer, the same, or older. Also, in a case where the device 200 has a display unit 216, the CRL version comparing unit 212 displays the results of having compared the CRL versions on the display unit 216, thereby showing the user the comparison results. In a case where the own CRL version has been found to be older as a result of comparing the CRL versions, the CRL version comparing unit 212 requests updating of the CRL. In a case where the own CRL version has been found to be newer as a result of comparing the CRL versions, the CRL version comparing unit 212 notifies the CRL version to the controller 100 and other devices included in the authentication system 10, suing the transmission unit 214.

When the device 200 receives a CRL transmission request from another device, the CRL transmission request accepting unit 213 acquires the CRL from the CRL processing unit 210, and transmits the CRL to the device that has made the request.

The display unit 216 shows the user information by displaying various types of information. For example, in a case where it has been found that another device has a CRL with a newer CRL version, by a new CRL version having been notified from another device, the user's attention may be directed to this, by making a display to that effect, or an option of whether to update the CRL or not may be displayed. Also, which device has completed updating of the CRL may be displayed, or which device has a CRL of which version may be displayed. Accordingly, which devices in the authentication system 10 have completed updating of the CRL, and which devices need to update the CRL, can be informed to the user.

Note that the display unit 216 does not have to be integral with the device 200, and may be a display device which a separate accessory from the device 200, such as a remote controller or the like has, or may be an arrangement where content to be displayed is notified to a cellular phone or a PC or the like, and display is made at the side receiving the notification.

Figure 43:
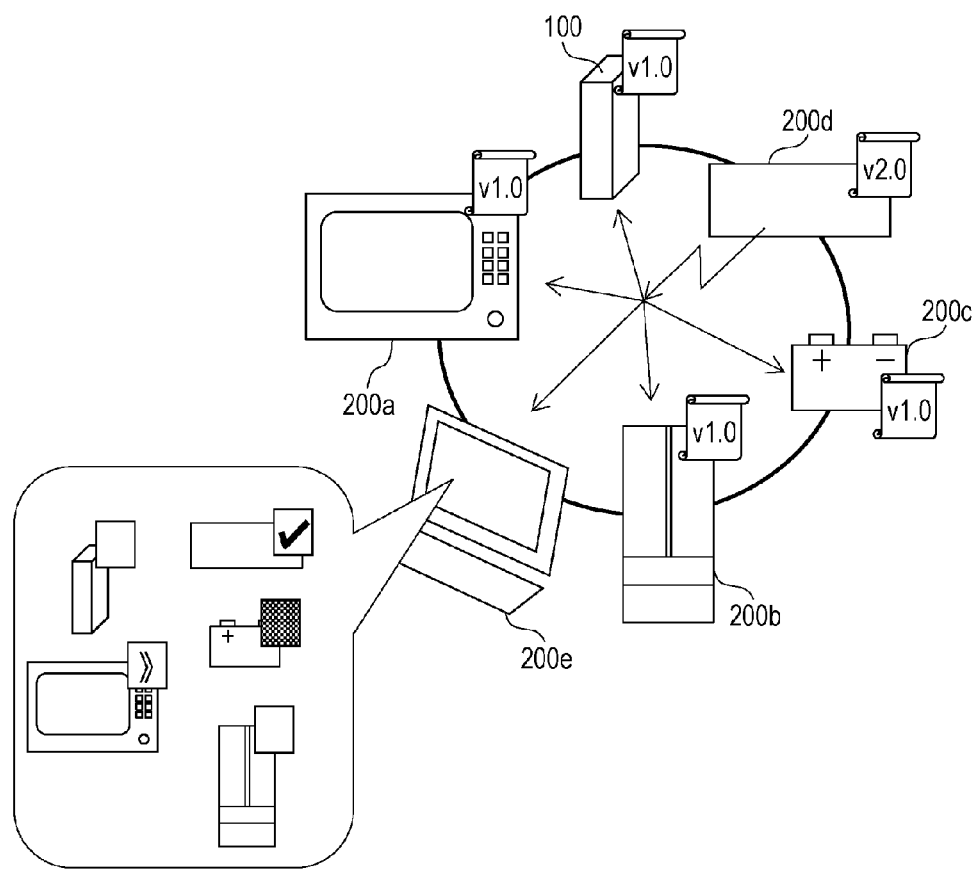
FIG. 43 is a diagram illustrating a display example of device states on a display unit in the third embodiment.
Figure 44:
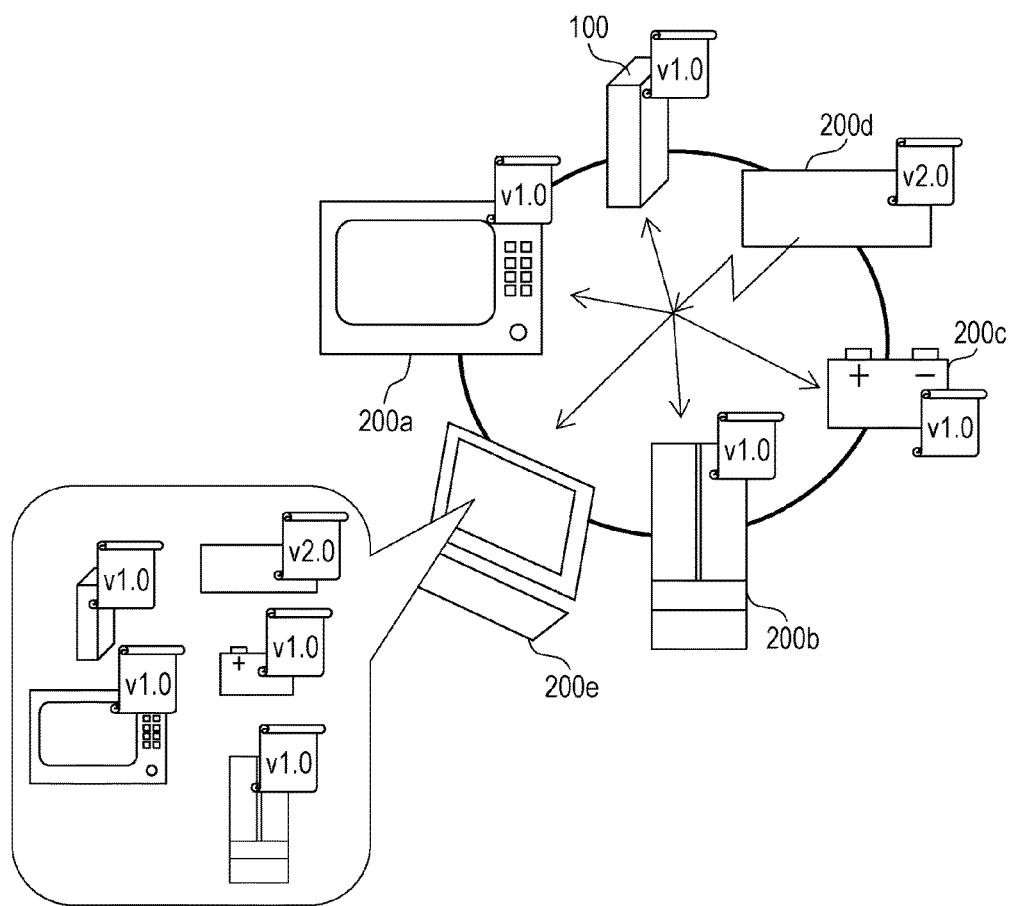
FIG. 44 is a diagram illustrating a display example of CRL versions on the display unit in the third embodiment.

FIGS. 43 and 44 are display examples by the display unit 216 of a device 200*e*. FIG. 43 is a display of which device has ended updating of the CRL, and FIG. 44 is a display of which device has a CRL of which CRL version. FIG. 43 is a display example indicating that the device 200*a* is currently updating the CRL, the device 200*c* is not connected to the authentication system 10, and the home appliance device 200*d* has the new CRL. FIG. 44 is a display example indicating that the controller 100 and devices 200*a* through *c* have CRLs of which the CRL version is v1.0, and the new home appliance device 200*d* has a CRL of which the CRL version is v2.0. It should be noted that the display examples in FIGS. 43 and 44 are only exemplary; other states may be shown, and the states and CRL version may be displayed using other expression methods. Also, multiple devices may made the display instead of just one device displaying, and a display may be made only showing devices which should be displayed (devices of which the state has changed, devices having old CRL versions, and so forth) instead of display information relating to all devices in the authentication system 10.

The controller pairing unit 217 performs processing of device registration to register the device 200 with the controller 100. Specific processing is as in FIGS. 11 and 12, described in the first embodiment of the present disclosure.

3.4 Detailed Configuration of Device 200

Figure 30:
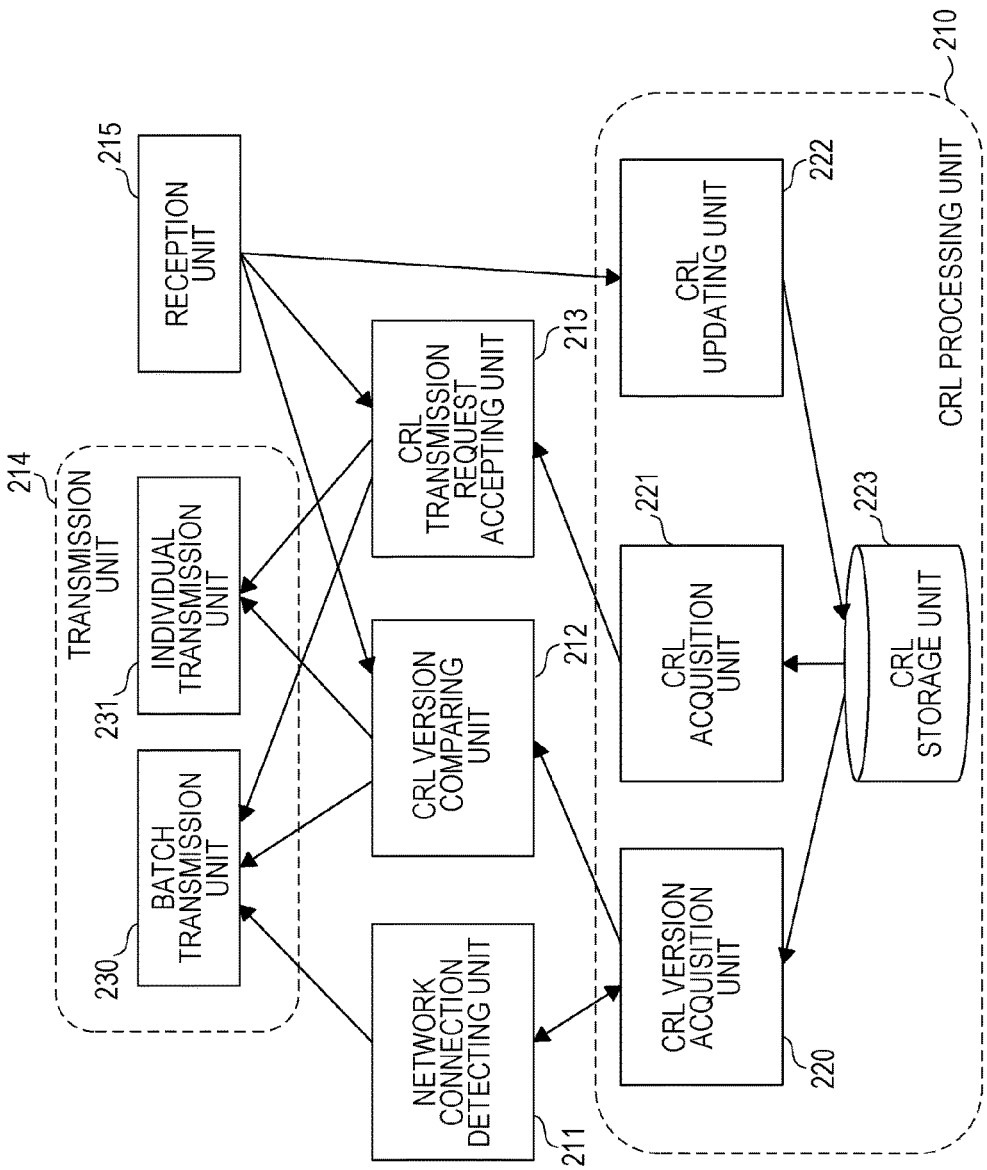
FIG. 30 is a configuration diagram illustrating primary functional blocks of a CRL processing unit in the devices in the third embodiment.

FIG. 30 is a configuration diagram of the device 200 in the third embodiment of the present disclosure. This is in further detail, centered on the CRL processing unit 210, unlike FIG. 29. In FIG. 30, the device 200 includes the communication unit 206, CRL processing unit 210, network connection detecting unit 211, CRL version comparing unit 212, CRL transmission request accepting unit 213, transmission unit 214, and reception unit 215. Although omitted from illustration, also included are the device management unit 201, authentication processing unit 204, display unit 216, and controller pairing unit 217, as in FIG. 29. Further, also included are the device history storage unit 202, device information storage unit 203, and authentication information storage unit 205, as in FIG. 6, although omitted from illustration. The device management unit 201, device history storage unit 202, device information storage unit 203, authentication processing unit 204, and authentication information storage unit 205 are the same as in the first embodiment of the present disclosure.

The CRL processing unit 210 stores a CRL, and performs processing of acquisition and updating of various information relating to the CRL. The CRL processing unit 210 includes a CRL version acquisition unit 220, a CRL acquisition unit 221, a CRL updating unit 222, and a CRL storage unit 223.

The CRL version acquisition unit 220 acquires the CRL version of the CRL that the CRL storage unit 223 stores. For example, in a case where the CRL is configured as in FIG. 5, the CRL version acquisition unit 220 acquires information of the CRL version portion in the configuration in FIG. 5. In a case where the CRL storage unit 223 stores multiple CRLs, the calling source specifies which CRL the CRL version is to be acquired for.

The CRL acquisition unit 221 acquires the CRL itself, that is stored by the CRL storage unit 223. For example, in a case where the CRL is configured as in FIG. 5, the CRL acquisition unit 221 acquires all components of the CRL. In a case where the CRL storage unit 223 stores multiple CRLs, the calling source specifies which CRL to be acquired.

The CRL updating unit 222 updates the CRL stored by the CRL storage unit 223. Updating processing is performed by updating the entire CRL, and a CRL is never partially updated. In a case where the CRL storage unit 223 stores multiple CRLs, the calling source specifies which CRL to be updated.

The CRL storage unit 223 stores a CRL. Just one CRL may be stored, or multiple CRLs may be stored.

The transmission unit 214 has a function of transmitting information to other devices. The transmission unit 214 includes a batch transmission unit 230 and an individual transmission unit 231.

The batch transmission unit 230 transmits the same information to multiple devices participating in the same authentication system 10 all at once. For example, in a case where connection to a network is detected, the network connection detecting unit 211 uses the batch transmission unit 230 to perform batch transmission of the CRL version to multiple other devices. Also, in a case where there is a transmission request for a CRL from multiple devices, the batch transmission unit 230 is used to transmit the CRL to the other multiple devices.

The individual transmission unit 231 transmits information to a specified device. The parts of the device 200 use the individual transmission unit 231 in cases where there is the need to transmit information individually to the specified device alone, such as in a case of returning comparison results of CRL versions transmitting a CRL for updating, or the like. Other components are the same as in FIGS. 6 and 29, so description will be omitted.

Note that description has been made that the transmission unit 214 includes the batch transmission unit 230 and the individual transmission unit 231, but this is not restrictive. Differentiation between batch transmission and individual transmission only differs in that where the transmission destination that the component called up by the transmission unit 214 is a destination for batch transmission or not, so the batch transmission unit 230 and individual transmission unit 231 do not have to be separate components.

3.5 Addition Processing of New Home Appliance Device

In a case where there is only one controller 100 in the authentication system 10 as illustrated in FIG. 23, and further that controller 100 is a controller that does not perform CRL updating, or in a case such as illustrated in FIG. 24 where the controller 100 is not connected to the server 300, the devices 200*a* through *c* connected to the authentication system 10 cannot update the CRL even if a new CRL is registered in the server 300. Accordingly, even in a case where the certificate ID of the controller 100 is added to the CRL, the devices 200*a* through *c* cannot recognize that the controller 100 is an unauthorized controller, since they cannot update their CRLs. Accordingly, a configuration will be described in the third embodiment of the present disclosure where other devices 200*a* through *c* within the authentication system 10 can update their CRLs using a new CRL that a new home appliance device 200*d* stores.

The home appliance device 200*d* stores the newest CRL at the time of the device being manufacture or sold. Accordingly, when the user purchase that home appliance device 200*d* and adds it to the authentication system 10, the CRLs of the other devices 200*a* through *c* within the authentication system 10 can be updated to the new CRL by using the new CRL that the home appliance device 200*d* stores. At this time, the new home appliance device 200*d* directly notifies the CRL version of the CRL that it stores in itself to the other devices within the authentication system 10, so the other devices within the authentication system 10 can know that a CRL of a new version exists. Accordingly, the devices within the authentication system 10 can be updated to the new CRL, and in a case where the certificate ID of the controller 100 has been added to the CRL, the devices can recognize that the controller 100 is an unauthorized controller.

Figure 31:
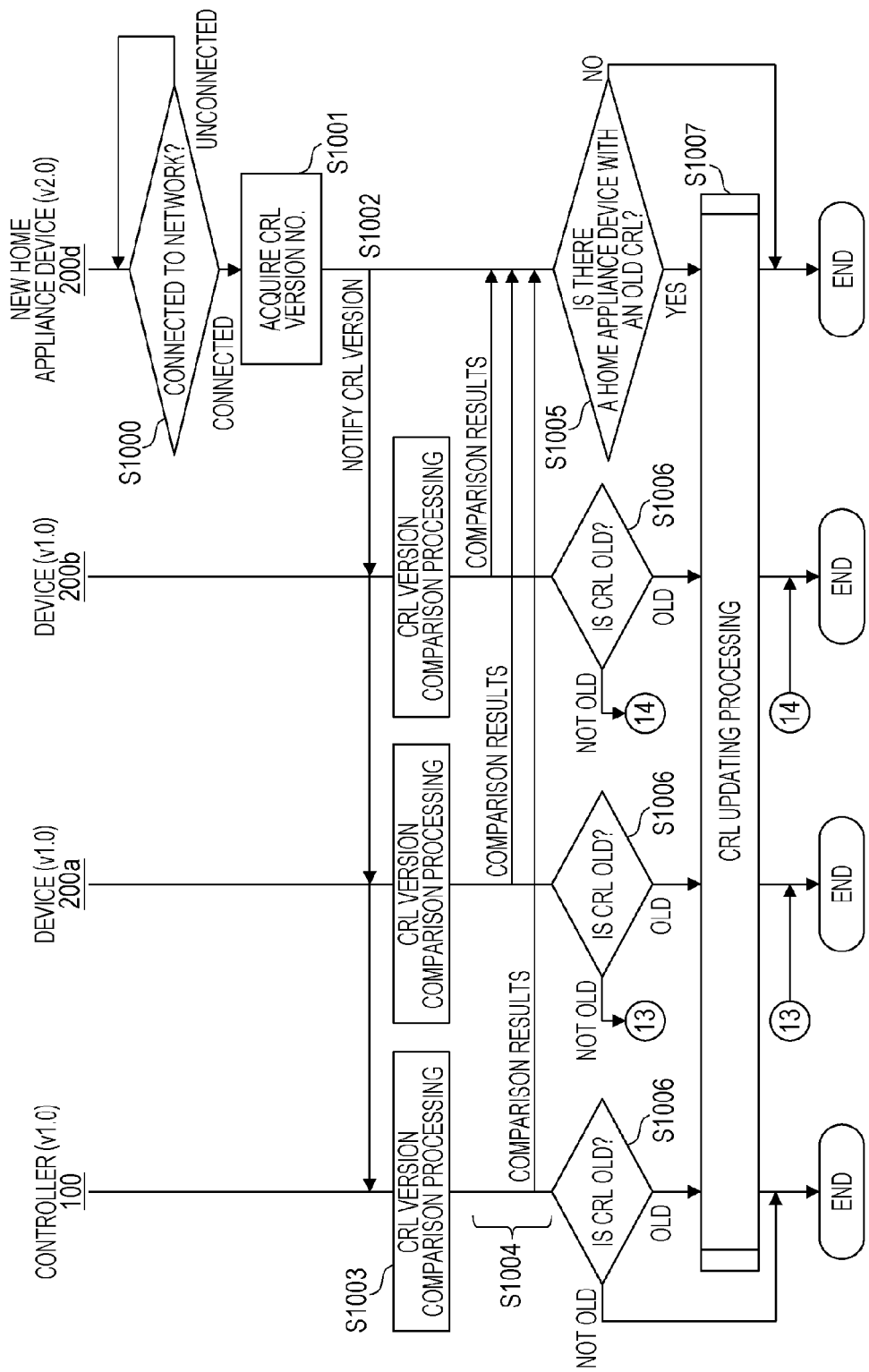
FIG. 31 is a diagram illustrating a CRL updating processing sequence due to a newly-purchased home appliance device in the third embodiment.
Figure 32:
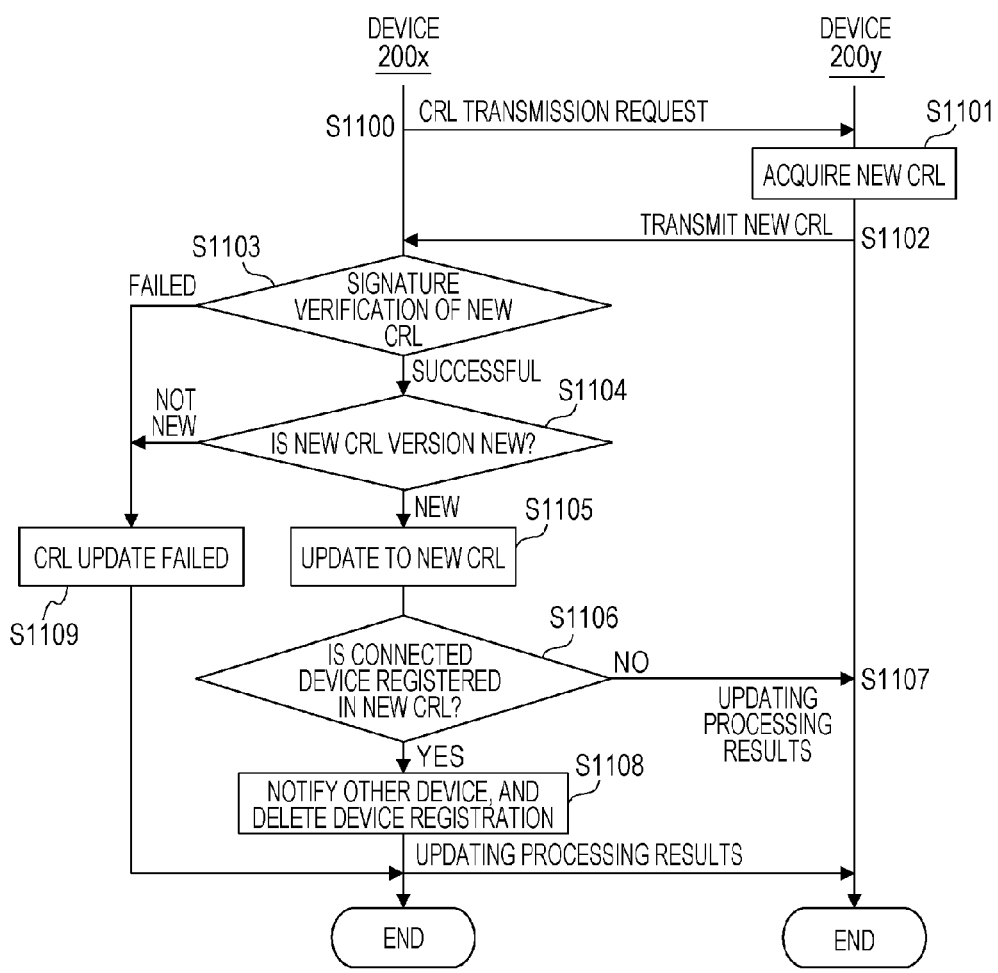
FIG. 32 is a detailed sequence diagram of CRL updating processing in the third embodiment.

3.5.1 Processing in Case where CRL Version of New Home Appliance Device is Newer The following is a description of the CRL updating processing in a case where a newly-purchased new home appliance device 200*d* is added to the authentication system 10 including the controller 100 and devices 200*a* and *b*, with reference to the sequences in FIGS. 31 and 32. In FIG. 31, the controller 100 and devices 200*a* and *b* store CRLs of which the CRL version is v1.0, and the new home appliance device 200*d* stores a CRL of which the CRL version is v2.0.

In a case of newly adding a device to the authentication system 10, first, device registration has to be performed. Device registration has been described in detail with reference to FIGS. 11 and 12 in the first embodiment of the present disclosure, so description will be omitted here. Hereinafter, description will be made regarding the processing after device registration has ended.

Upon being added to the authentication system 10 by the user, the new home appliance device 200*d* detects that it has been connected to the network of the authentication system 10 by the network connection detecting unit 211 of the new home appliance device 200*d* (S1000).

The network connection detecting unit 211 of the new home appliance device 200*d* detects that the new home appliance device 200*d* has been connected to the network, and thereupon requests the CRL version acquisition unit 220 of the new home appliance device 200*d* to acquire the CRL version of the CRL that the new home appliance device 200*d* stores (S1001).

Upon having acquired the CRL version of the new home appliance device 200*d* from the CRL version acquisition unit 220, the network connection detecting unit 211 of the of the new home appliance device 200*d* requests the batch transmission unit 230 of the new home appliance device 200*d* to transmit the CRL version. The batch transmission unit 230 of the new home appliance device 200*d* notifies all devices within the authentication system 10 (the controller 100 and devices 200*a* and *b*) of the CRL version of the new home appliance device 200*d* (S1002).

The controller 100 and devices 200a and b which have received the CRL version compare the CRL versions that they each store with the notified CRL version (S1003), and notify the comparison results to the notification source, which the new home appliance device 200d (S1004).

The new home appliance device 200d confirms whether or not there is a controller 100 or devices 200a and b storing a CRL with an old CRL version, based on the comparison results regarding CRL versions received from the other devices (S1005).

The controller 100 and devices 200a and b judge whether their CRL versions are old or not, as the result of having compared the CRL versions in step S1003 (S1006).

In step S1004 in FIG. 31, all devices, which are the controller 100 and devices 200a and b, will notify comparison results that the CRLs that they have are of an older CRL version than the CRL that the new home appliance device 200d stores. Also, the controller 100 and devices 200a and b will judge in step S1006 that their CRL versions are older, since they store CRLs with an older version.

In a case where determination is made in step S1005 that there is a controller 100 or devices 200a and b storing a CRL with an old CRL version, the new home appliance device 200d performs CRL updating processing (S1007).

In a case where determination is made in step S1005 that there are no controller 100 or devices 200a and b storing a CRL with an old CRL version, the new home appliance device 200d ends the new home appliance device adding processing.

In a case where the controller 100 or devices 200a or b judge in step S1006 that their CRL version is old, CRL updating processing is performed (S1007).

In a case where the controller 100 or devices 200a or b judge in step S1006 that their CRL version is not old, the new home appliance device addition processing ends.

Next, a case where a device 200x updates the CRL of the device 200x using a CRL of a device 200y will be described in FIG. 32. In the case of FIG. 31, the device 200x is the controller 100 or devices 200a through c, and the device 200y is the new home appliance device 200d. FIG. 32 illustrates updating processing between two devices, such as between the controller 100 and new home appliance device 200d, or the device 200a and new home appliance device 200d, or the device 200b and new home appliance device 200d, or the device 200c and new home appliance device 200d.

The device 200x transmits a CRL transmission request to the device 200y (S1100).

The device 200y receives the CRL transmission request from the device 200x by the reception unit 215, and accepts the request at the CRL transmission request accepting unit 213.

The CRL transmission request accepting unit 213 of the device 200y calls up the CRL acquisition unit 221, and acquires the CRL of the device 200y from the CRL storage unit 223 (S1101).

The CRL transmission request accepting unit 213 of the device 200y requests the individual transmission unit 231 of the transmission unit 214 to transmit the CRL to the device 200x. The individual transmission unit 231 transmits the CRL to the device 200x (S1102).

The device 200x receives the CRL from the device 200y by the reception unit 215, and performs updating processing of the CRL at the CRL updating unit 222.

The CRL updating unit 222 of the device 200x verifies the signature of the received CRL (S1103).

In a case where verification of the signature in step S1103 is successful, the CRL updating unit 222 of the device 200x compares the CRL version of the received CRL with the CRL version of the CRL of the device 200x stored in the CRL storage unit 223, and confirms that the CRL version of the received CRL is newer (S1104).

In a case where confirmation is made in step S1104 that the CRL version of the received CRL is newer, the CRL updating unit 222 of the device 200x updates the CRL stored in the CRL storage unit 223 with the received CRL (S1105).

The CRL updating unit 222 of the device 200x confirms whether or not the other devices in the authentication system 10 (The controller 100 and devices 200a through c) are registered in the updated CRL (S1106).

In a case where determination is made in S1106 that the other devices in the authentication system 10 (The controller 100 and devices 200a through c) are not registered in the updated CRL, the CRL updating unit 222 of the device 200x ends the updating processing, and notifies successful updating results to the device 200y (S1107).

In a case where determination is made in S1106 that another device in the authentication system 10 (The controller 100 and devices 200a through c) is registered in the updated CRL, the CRL updating unit 222 of the device 200x notifies the other devices in the authentication system 10 (controller 100 and devices 200a through c) of the ID (controller ID or device ID) of the device registered in the CRL through the batch transmission unit 230, and deletes from controller registration or device registration (S1108).

In a case where signature verification in step S1103 has failed, or determination is made in S1104 that the CRL version of the received CRL is not new, the CRL updating unit 222 of the device 200x notifies the device 200y of the results that the updating has failed (S1109). The device 200y is also notified of the results that the updating has failed after the processing in S1108 as well.

3.5.2 Processing in Case where CRL Version of Existing Home Appliance Device is Newer The following is a description of CRL updating processing when a newly-purchased new home appliance device 200d is added to the authentication system 10 including the controller 100 and devices 200a and b. Description will be made with reference to the sequence in FIG. 33. Assumption will be made here that the controller 100 and devices 200a and b have CRLs of which the CRL version is v2.0, while the new home appliance device 200d stores a CRL with a CRL version v1.0.

Figure 33:
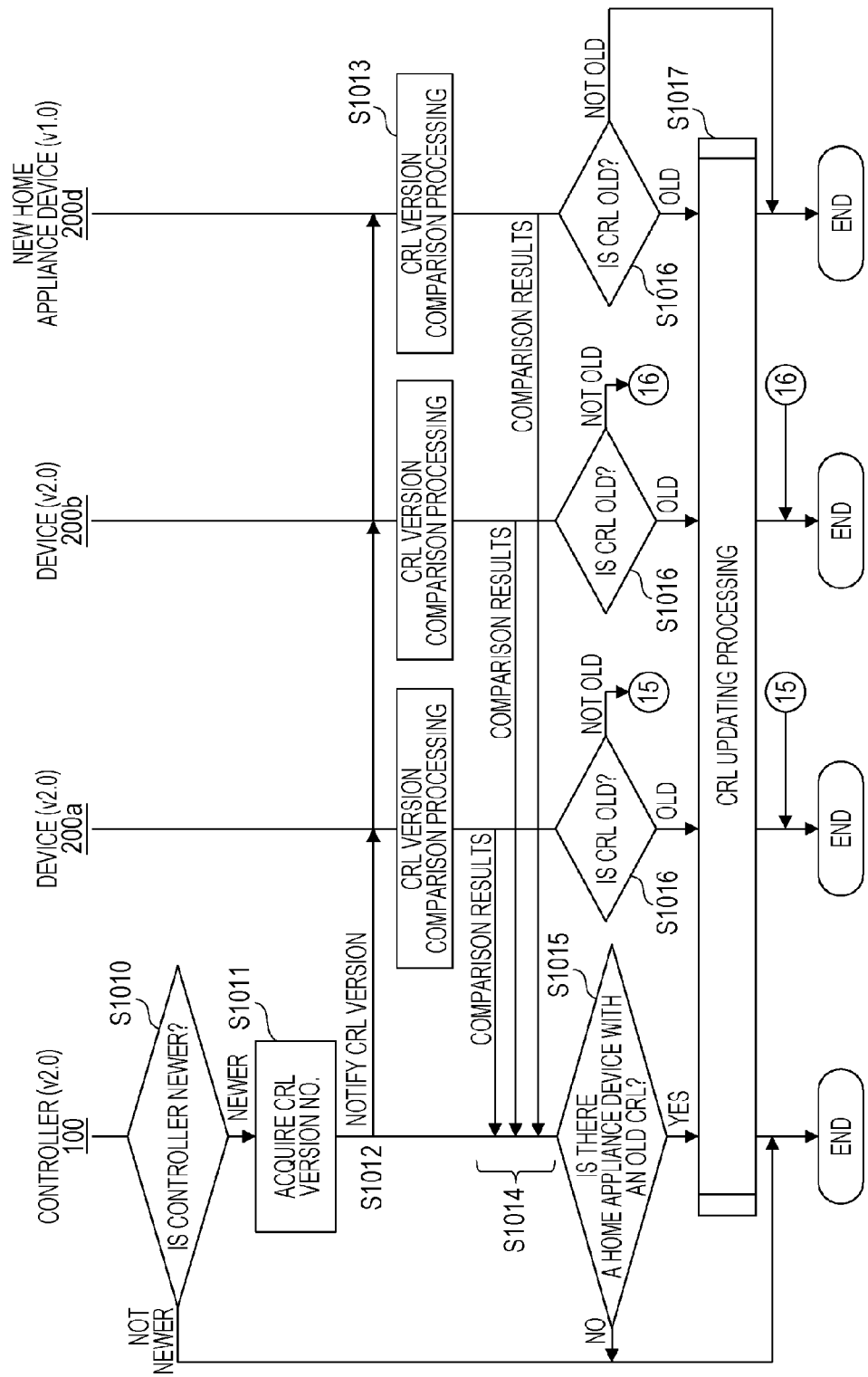
FIG. 33 is a diagram illustrating a CRL updating sequence by an already-existing device in the third embodiment.

The processing of when the new home appliance device 200d is added to the authentication system 10 is the same as in the steps in FIG. 31. However, the CRL version of the new home appliance device 200d is older than the other devices in the authentication system 10, so the processing does not end with the sequence in FIG. 31 alone. Updating processing of the CRL of the new home appliance device 200d has to be performed after the sequence in FIG. 31. FIG. 33 illustrates a sequence in a case where, in the processing after the sequence in FIG. 31, the controller 100 centrally operates to update the CRL of the new home appliance device 200d. Note however, than when comparing the sequences in FIGS. 33 and 31, the processing is the same processing, and the only difference is which devices are performing the processing.

In FIG. 33, the CRL version of the controller 100 and devices 200a and b is newer than the CRL version of the new home appliance device 200d, so the CRL version of the controller 100 and devices 200a and b is determined in step S1006 in FIG. 31 that the CRL version is not old. Accordingly, the controller 100 and devices 200a and b do not performed CRL updating processing (S1007).

First, the controller 100 confirms whether the comparison results of the CRL versions in step S1003 are that the CRL version of the controller 100 is newer (S1010).

The CRL version acquisition unit 220 of the controller 100 is requested to acquire the CRL version of the CRL that the controller 100 stores (S1011).

Upon acquiring the CRL version from the CRL version acquisition unit 220, the controller 100 requests the batch transmission unit 230 to transmit the CRL version. The batch transmission unit 230 of the controller 100 notifies the CRL version of the controller 100 to all devices in the authentication system 10 (devices 200a and b, and new home appliance device 200d) (S1012).

The devices 200a and b and new home appliance device 200d that have received the notification of the CRL version compare the CRL version that each of the devices store with the notified CRL version (S1013), and notifies the comparison results to the controller 100 that is the notifying source (S1014).

The controller 100 confirms, from the results of CRL version comparison received from the other devices, whether or not there are devices 200a and b or new home appliance device 200d that has a CRL with an old CRL version (S1015).

The devices 200a and b, and new home appliance device 200d compare CRL versions in S1013, and as a result judge whether or not the CRL version is old (S1016).

In step S1014 in FIG. 33, the new home appliance device 200d will make notification of comparison results that the CRLs that it stores has an older CRL version than the CRL that the controller 100 stores. Also, in step S1016, the new home appliance device 200d will judge that its CRL version is old, since it has a CRL with an old CRL version.

In a case where determination is made that there is a device 200a or b or new home appliance device 200d that has an old CRL version in step S1015, the controller 100 performs CRL updating processing (S1017). The details of CRL updating processing is the same as the processing described in FIG. 32. The device 200x in FIG. 32 is the devices 200a through c and new home appliance device 200d, and the device 200y is the controller 100.

In a case where determination is made that there is no device 200a or b or new home appliance device 200d that has an old CRL version in step S1015, the controller 100 ends processing.

As described above, the processing of step S1011 through step S1017 in FIG. 33 is the same processing as step S1001 through step S1007 in FIG. 31 as far as the processing goes, and the only difference is which devices are performing the processing.

3.5.3 Flowchart of Processing of Adding New Home Appliance Device at Individual Devices FIGS. 31 through 33 have been used to described a sequence when the new home appliance device 200d is added to the authentication system 10, mainly with regard to information transmission among the devices.

Figure 34:
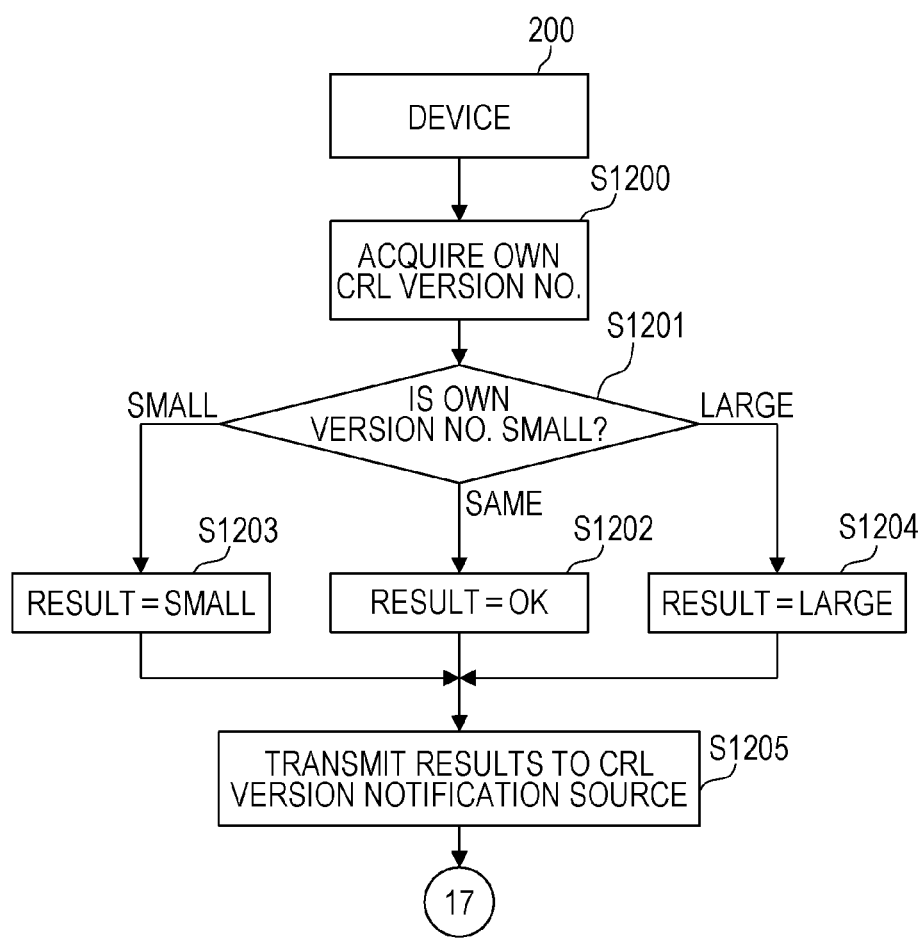
FIG. 34 is a flowchart illustrating CRL version comparison processing in the third embodiment.
Figure 35:
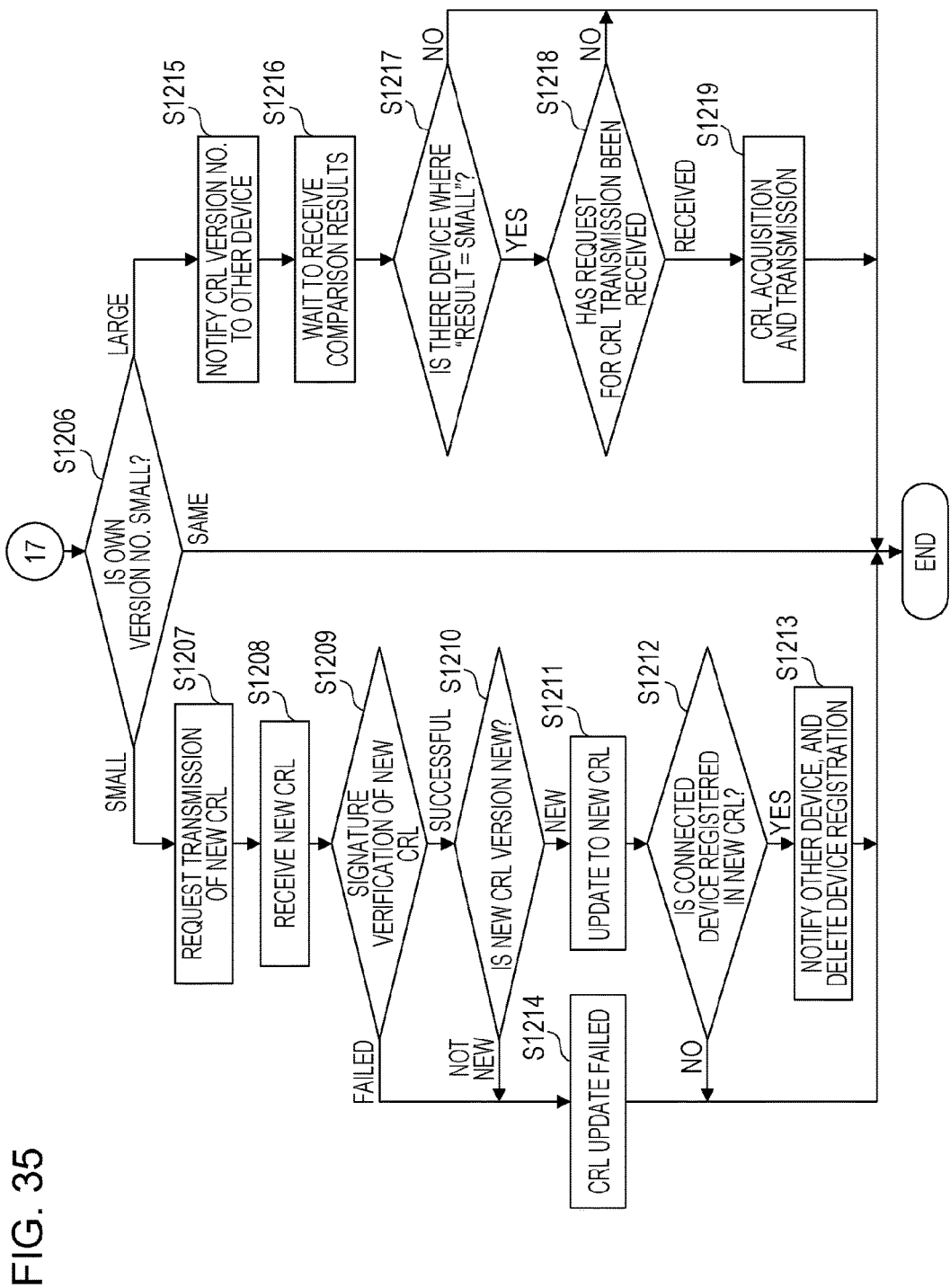
FIG. 35 is a flowchart illustrating CRL updating processing in the third embodiment.

In FIGS. 34 and 35, processing within the controller 100 and devices 200a through c when the new home appliance device 200d is added to the authentication system 10 will be described by way of the flowcharts. Processing after the device 200 has received notification of the CRL version from another device will be described in FIGS. 34 and 35.

After having received notification of the CRL version from another device, the device 200 acquires the CRL version that it stores itself from the CRL version acquisition unit 220, using the CRL version comparing unit 212 (S1200).

The CRL version comparing unit 212 of the device 200 compares the CRL version regarding which notification has been received with the CRL version acquired from the CRL version acquisition unit 220 (S1201).

In a case where the CRL versions are found to be the same as the result of comparison in step S1201, the CRL version comparing unit 212 of the device 200 sets "result=OK (same)" (S1202).

In a case where the CRL version acquired from the CRL version acquisition unit 220 found to be is smaller (older) as the result of comparison in step S1201, the CRL version comparing unit 212 of the device 200 sets "result=small (old)" (S1203).

In a case where the CRL version acquired from the CRL version acquisition unit 220 found to be is larger (newer) as the result of comparison in step S1201, the CRL version comparing unit 212 of the device 200 sets "result=large (new)" (S1204).

The CRL version comparing unit 212 of the device 200 requests the individual transmission unit 231 of the transmission unit 214 to notify the comparison results to the notification source (S1205).

The individual transmission unit 231 notifies the comparison results to the notification source.

The device 200 confirms whether "result=small (old)" has been set as the comparison results (S1206).

In a case where "result=small (old)" has been set as the comparison results in step S1206, the device 200 judges that CRL updating is necessary, and requests the device storing the newer CRL to transmit the CRL (S1207).

The device 200 receives the new CRL at the reception unit 215 (S1208).

The device 200 performs CRL updating processing using the CRL updating unit 222. The details thereof are the same as in step S1103 through step S1109 in FIG. 32.

The CRL updating unit 222 of the device 200 verifies the signature of the received CRL (S1209).

In a case where verification of the signature in step S1209 is successful, the CRL updating unit 222 of the device 200 compares the CRL version of the received CRL and the CRL version of the CRL that the device 200 stores in the CRL storage unit 223, and confirms that the CRL version of the received CRL is newer (S1210).

In a case where configuration has been made in step S1210 that the CRL version of the received CRL is newer, the CRL updating unit 222 of the device 200 updates the CRL stored in the CRL storage unit 223 with the received CRL (S1211).

The CRL updating unit 222 of the device 200 confirms whether the devices within the authentication system 10 are registered in the updated CRL (S1212).

In a case where judgment is made in step S1212 that the devices within the authentication system 10 are not registered in the updated CRL, the CRL updating unit 222 of the device 200 ends the updating processing.

In a case where determination is made in step S1212 that a device within the authentication system 10 is registered in the updated CRL, the CRL updating unit 222 of the device 200 notifies the ID (controller ID or device ID) of the controller 100 or devices 200a and b registered in the CRL to the other devices within the authentication system 10 via the batch transmission unit 230, and deletes from controller registration or device registration (S1213).

In a case where signature verification in step S1209 has failed, or in a case where determination is made that the CRL version of the CRL received in S1210 is not new, the device notifies the transmission source of the new CRL of the results that the updating has failed (S1214). Also, the results that the updating has failed are also notified after the processing of S1213.

In a case where "results=large (new)" are set in the comparison results in step S1206, the device 200 notifies the CRL version to other devices (S1215).

The device 200 waits for other devices to return the CRL version comparison results (S1216).

The device 200 confirms whether there is another device where "results=small (old)", from the comparison results of CRL versions received from other devices (S1217).

In a case of judging in step S1217 that there is another device where "results=small (old)", the device 200 confirms whether a transmission request for a CRL has been received from that device (S1218).

In a case where reception of a transmission request for a CRL from another device is confirmed in step S1218, the device 200 acquires a CRL to be stored in the CRL storage unit 223 via the CRL acquisition unit 221, and transmits it (S1219).

In a case of judging in step S1217 that there are no devices where "results=small (old)", and that a transmission request for a CRL has not been confirmed from another device in step S1218, the processing ends.

In a case where "results=OK (same)" is set to the comparison results in step S1206, the device 200 performs no processing in particular.

3.6 Advantages of Third Embodiment of Present Disclosure

A device connected to one controller could not update the CRL if the controller is an unauthorized controller. Also, the CRL could not be updated in a case where the controller is not connected to an external network.

In the third embodiment of the present disclosure, a device newly added from outside the authentication system 10 performs batch transmission of the CRL version or CRL to each device within the authentication system 10. Accordingly, the fact that a new CRL exists can be known via the device newly added from outside of the authentication system 10, and the new CRL can be acquired and updated. Thus, making the CRL updatable enables connection to unauthorized controls and unauthorized devices to be prevented, and safe connection to be made between authorized controllers and authorized devices.

4. Other Modifications

Although the present disclosure has been described based on the embodiments above, it is needless to say that the disclosure is not restricted to the above embodiments. The following arrangements are also included in the present disclosure.

(1) In the above embodiments, the controller may acquire a CRL from the server during the device registration processing. Acquisition may be periodically performed outside of device registration processing. Acquisition may also be performed before the server next issue date of the CRL.

(2) While the device communicates with the server via the controller to acquire a CRL in the above embodiments, this is not restrictive. The CRL may be acquired by a mobile terminal connected to the server. Communication between the mobile terminal and the device may be Near field communication (NFC) communication or Bluetooth (a registered trademark) communication.

(3) Although other devices and controllers are notified when a device determines a controller to be unauthorized in the above embodiments, in a case where the devices or controllers that receive the notification have display functions, a display screen to the effect that an unauthorized controller has been detected may be output. Also, in a case where there is no display screen, an error code may be displayed or a lamp made to blink. Accordingly, the user having the unauthorized controller can confirm the display, and can replace the unauthorized controller.

(4) While challenge-response authentication using a shared key is performed in the above second embodiment, this is not restrictive, and EAP-PSK may further be performed using the authentication method described in RFC5191.

(5) The key for encrypted communication may be exchanged at the time of device registration processing in the above first embodiment. Diffie-Hellman (DH) or ECDH may be used as the key exchange method.

(6) In the above embodiments, the controller may display the power consumption of the devices to which connection is to be made, the amount of electric power charged in a battery, and the amount of power generated by a solar generator.

(7) The controller in the above embodiments may be a power distribution board installed in a home.

(8) Communication between the controller and device in the above embodiments may be Wi-Fi, Specified Low Power Wireless, Power Line Communication, or Bluetooth (a registered trademark).

(9) In the above embodiments, the portal server issues CRLs as a certificate authority, but this is not restrictive. A manufacturer's server, service server, or content server may issue CRLs as a certificate authority.

(10) In the above embodiments, CRLs are issued including all certificate IDs of public key certificates of unauthorized controllers, but this is not restrictive. CRLs only for manufactured devices may be issued to manufacturer servers, CRLs may be issued only for devices and controllers that relate to services provided by a service server, and CRLs may be issued only for devices capable of connecting to a content server. Further, CRLs may be issued according to the types of devices manufactured for manufacturer servers or by year of manufacturing.

Figure 36:
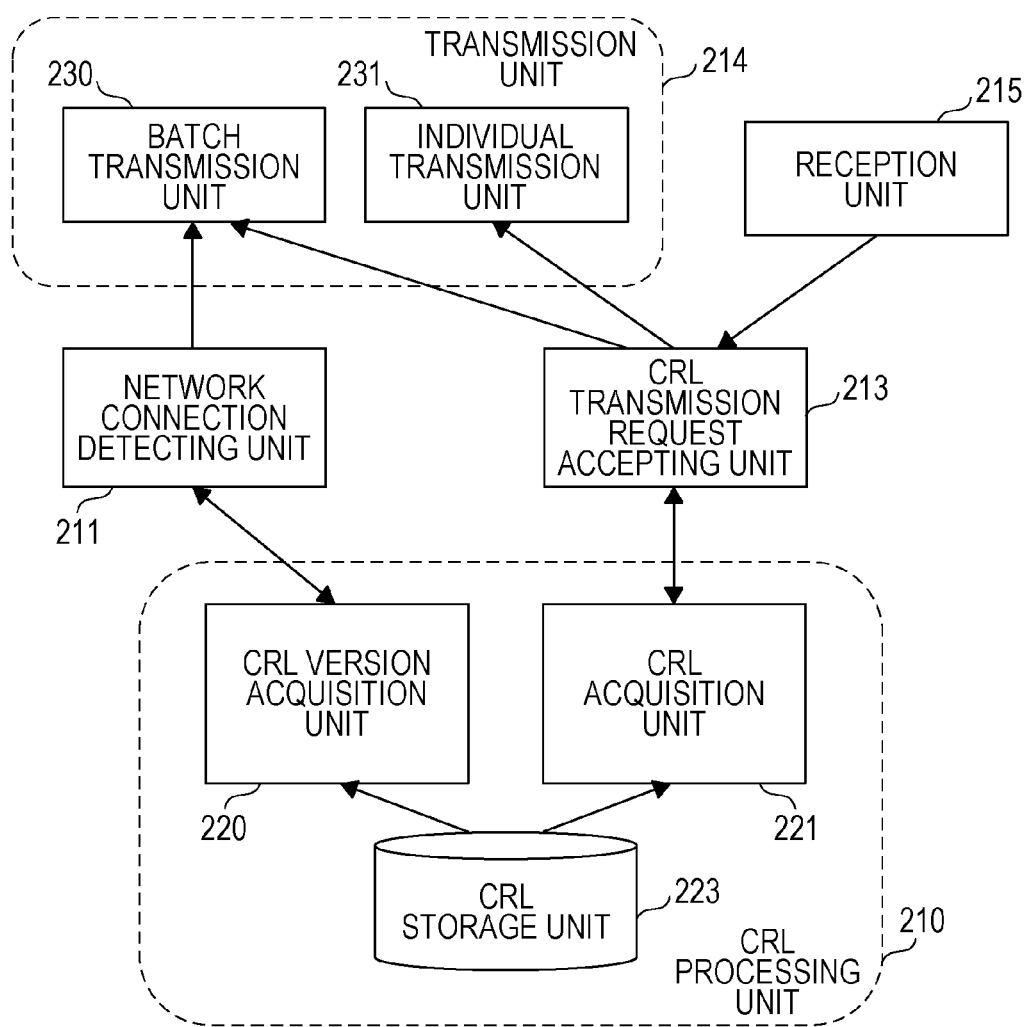
FIG. 36 is a configuration diagram illustrating primary functional blocks of the CRL processing unit in devices according to a modification (11)

(11) The device 200 in the above embodiments includes the device management unit 201, device history storage unit 202, device information storage unit 203, authentication processing unit 204, authentication information storage unit 205, communication unit 206, CRL processing unit 210, network connection detecting unit 211, CRL version comparing unit 212, CRL transmission request accepting unit 213, transmission unit 214, reception unit 215, display unit 216, and controller pairing unit 217. The CRL processing unit 210 includes the CRL version acquisition unit 220, CRL acquisition unit 221, CRL updating unit 222, and CRL storage unit 223, but this is not restrictive. For example, as illustrated in FIG. 36, the device 200 may include the CRL processing unit 210, network connection detecting unit 211, CRL transmission request accepting unit 213, transmission unit 214, reception unit 215, and the CRL processing unit 210 may include the CRL version acquisition unit 220, CRL acquisition unit 221, and CRL storage unit 223.

According to the above configuration, when a device 200 is added to the authentication system 10, batch transmission of the CRL version is performed, and the CRL in the CRL storage unit 223 can be transmitted to other devices as necessary. Accordingly, due to the device 200 being added to the authentication system 10, devices having CRLs with older CRL versions than the device 200 can update to the CRL that the device 200 stores.

Figure 37:
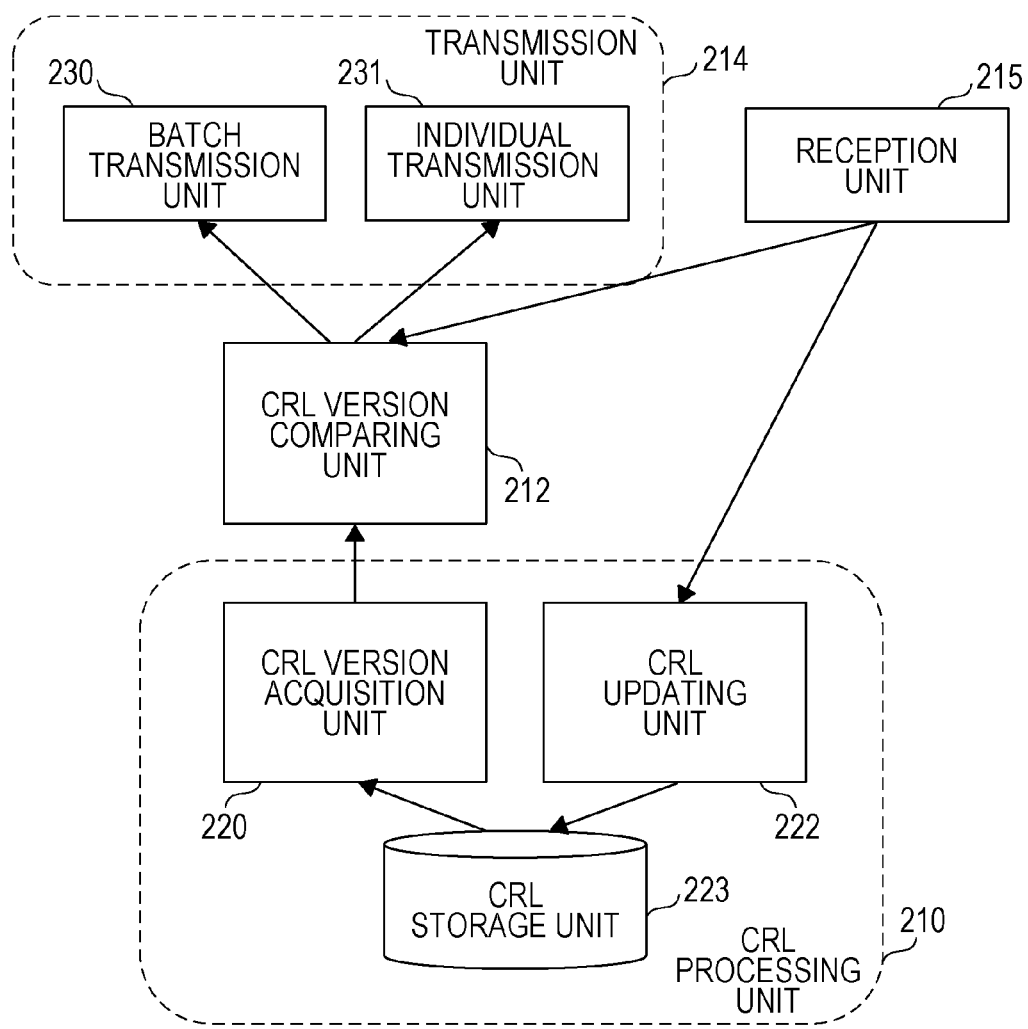
FIG. 37 is a configuration diagram illustrating primary functional blocks of the CRL processing unit in devices according to a modification (12)

(12) The device 200 in the above embodiments includes the device management unit 201, device history storage unit 202, device information storage unit 203, authentication processing unit 204, authentication information storage unit 205, communication unit 206, CRL processing unit 210, network connection detecting unit 211, CRL version comparing unit 212, CRL transmission request accepting unit 213, transmission unit 214, reception unit 215, display unit 216, and controller pairing unit 217. The CRL processing unit 210 includes the CRL version acquisition unit 220, CRL acquisition unit 221, CRL updating unit 222, and CRL storage unit 223, but this is not restrictive. As illustrated in FIG. 37 for example, the device 200 may include the CRL processing unit 210, CRL version comparing unit 212, transmission unit 214, and reception unit 215, and the CRL processing unit 210 may include the CRL version acquisition unit 220, CRL updating unit 222, and CRL storage unit 223.

According to the above configuration, when the new home appliance device 200d is added to the authentication system 10, the device 200 receives the CRL version from the new home appliance device 200d, and in a case where the CRL of the device 200 is old, transmission of a new CRL can be requested to the new home appliance device 200d via the individual transmission unit 231, and the CRL can be updated. Also, in a case where the CRL of the device 200 is newer, the other devices including the new home appliance device 200d in the authentication system 10 can be notified via the batch transmission unit 230 that the device 200 has a CRL newer than the new home appliance device 200d.

Figure 38:
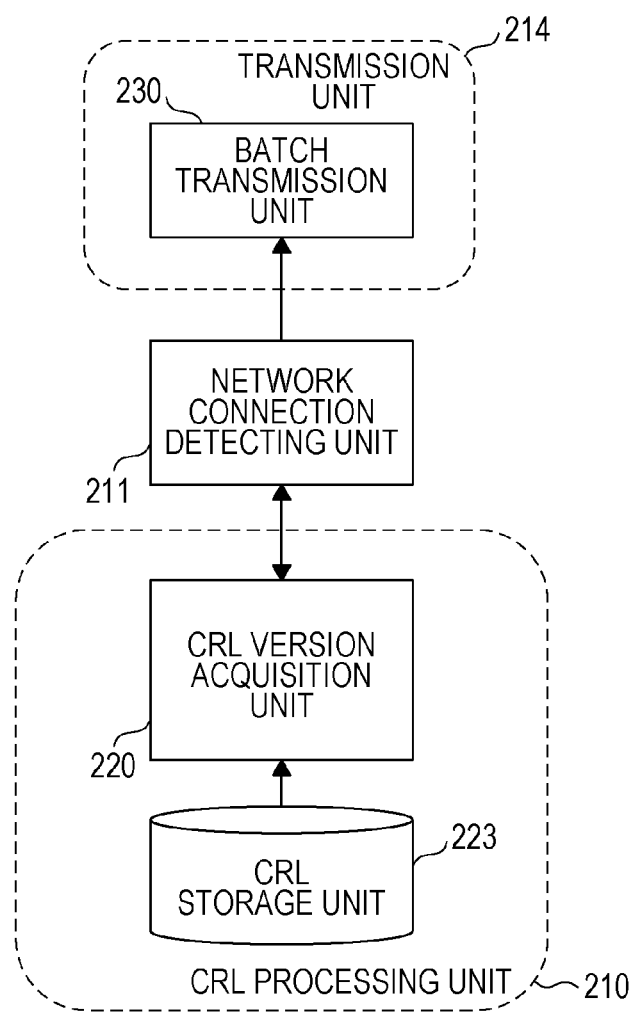
FIG. 38 is a configuration diagram illustrating primary functional blocks of the CRL processing unit in devices according to a modification (13)

(13) The device 200 in the above embodiments includes the device management unit 201, device history storage unit 202, device information storage unit 203, authentication processing unit 204, authentication information storage unit 205, communication unit 206, CRL processing unit 210, network connection detecting unit 211, CRL version comparing unit 212, CRL transmission request accepting unit 213, transmission unit 214, reception unit 215, display unit 216, and controller pairing unit 217, the CRL processing unit 210 includes the CRL version acquisition unit 220, CRL acquisition unit 221, CRL updating unit 222, and CRL storage unit 223, and the transmission unit 214 includes the batch transmission unit 230 and individual transmission unit 231 but this is not restrictive. As illustrated in FIG. 38 for example, the device 200 may include the CRL processing unit 210, network connection detecting unit 211, and transmission unit 214, and the CRL processing unit 210 may include the CRL version acquisition unit 220 and CRL storage unit 223, and the transmission unit 214 may include the batch transmission unit 230.

According to the above configuration, a batch transmission may be made of a CRL version when a device 200 is added to the authentication system 10. Accordingly, due to a device 200 being added to the authentication system 10, devices having CRLs of CRL versions older than the device 200 can know that a new CRL has been issued. The devices within the authentication system 10 can judge that the controller 100 is an unauthorized controller, since a new CRL was not notified from the controller 100 even though a new CRL had been issued, and can cut off connection with the controller 100.

Figure 39:
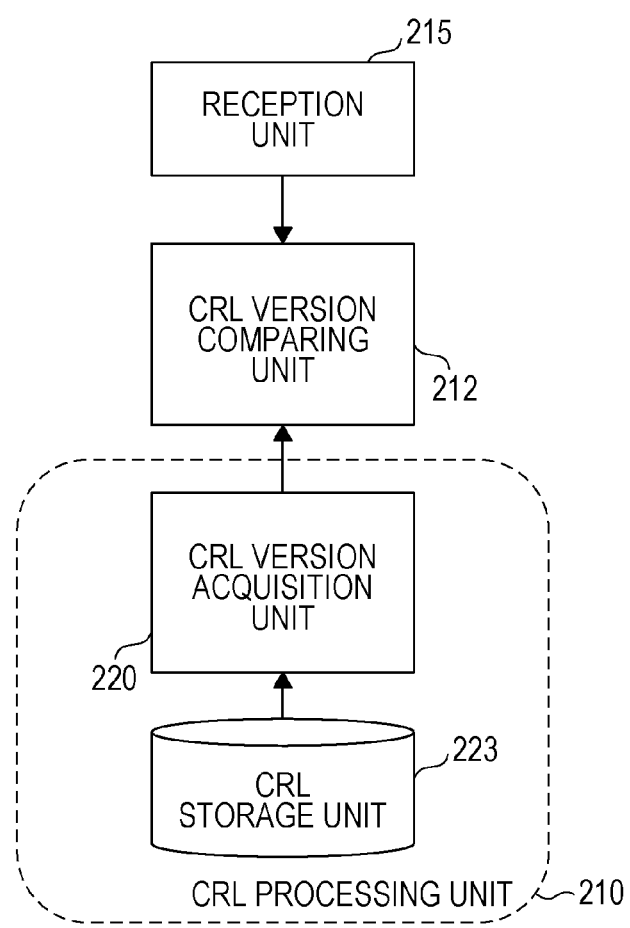
FIG. 39 is a configuration diagram illustrating primary functional blocks of the CRL processing unit in devices according to a modification (14)

(14) The device 200 in the above embodiments includes the device management unit 201, device history storage unit 202, device information storage unit 203, authentication processing unit 204, authentication information storage unit 205, communication unit 206, CRL processing unit 210, network connection detecting unit 211, CRL version comparing unit 212, CRL transmission request accepting unit 213, transmission unit 214, reception unit 215, display unit 216, and controller pairing unit 217. The CRL processing unit 210 includes the CRL version acquisition unit 220, CRL acquisition unit 221, CRL updating unit 222, and CRL storage unit 223, but this is not restrictive. As illustrated in FIG. 39 for example, the device 200 may include the CRL processing unit 210, CRL version comparing unit 212, and reception unit 215, and the CRL processing unit 210 may include the CRL version acquisition unit 220 and CRL storage unit 223.

According to this configuration, when the new home appliance device 200d is added to the authentication system 10, the device 200 receives the CRL version from the new home appliance device 200d, and can confirm which of the CRLs stored by the device 200 and the new home appliance device 200d is newer. Accordingly, when the new home appliance device 200d is added to the authentication system 10, the device 200 can know whether a new CRL has been issued. The device 200 can judge that the controller 100 is an unauthorized controller, since a new CRL was not notified from the controller 100 even though a new CRL had been issued, and can cut off connection with the controller 100.

Figure 40:
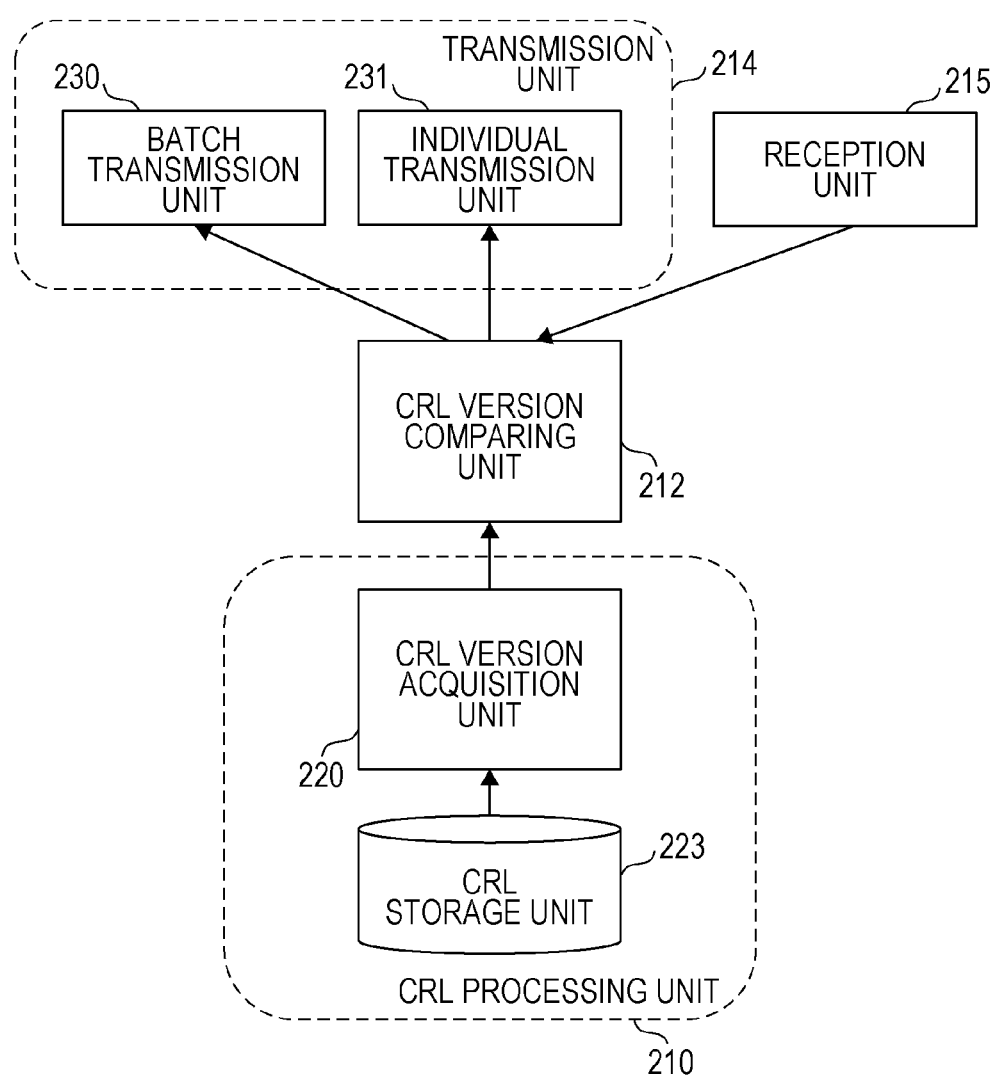
FIG. 40 is a configuration diagram illustrating primary functional blocks of the CRL processing unit in devices according to a modification (15)

(15) The device 200 in the above embodiments includes the device management unit 201, device history storage unit 202, device information storage unit 203, authentication processing unit 204, authentication information storage unit 205, communication unit 206, CRL processing unit 210, network connection detecting unit 211, CRL version comparing unit 212, CRL transmission request accepting unit 213, transmission unit 214, reception unit 215, display unit 216, and controller pairing unit 217. The CRL processing unit 210 includes the CRL version acquisition unit 220, CRL acquisition unit 221, CRL updating unit 222, and CRL storage unit 223, but this is not restrictive. As illustrated in FIG. 40 for example, the device 200 may include the CRL processing unit 210, CRL version comparing unit 212, transmission unit 214, and reception unit 215, and the CRL processing unit 210 may include the CRL version acquisition unit 220 and CRL storage unit 223.

According to this configuration, when the new home appliance device 200d is added to the authentication system 10, the device 200 receives the CRL version from the new home appliance device 200d, and in a case where the CRL version of the new home appliance device 200d is older, the device 200 can notify its own CRL version to other devices (the new home appliance device 200d in particular). Accordingly, all devices within the authentication system 10 can be updated to new CRLs at all times.

Figure 41:
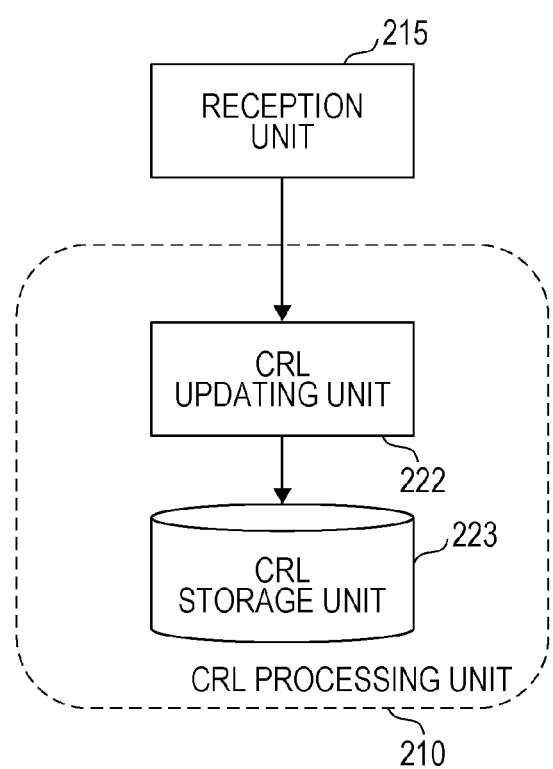
FIG. 41 is a configuration diagram illustrating primary functional blocks of the CRL processing unit in devices according to a modification (16)

(16) The device 200 in the above embodiments includes the device management unit 201, device history storage unit 202, device information storage unit 203, authentication processing unit 204, authentication information storage unit 205, communication unit 206, CRL processing unit 210, network connection detecting unit 211, CRL version comparing unit 212, CRL transmission request accepting unit 213, transmission unit 214, reception unit 215, display unit 216, and controller pairing unit 217. The CRL processing unit 210 includes the CRL version acquisition unit 220, CRL acquisition unit 221, CRL updating unit 222, and CRL storage unit 223, but this is not restrictive. As illustrated in FIG. 41 for example, the device 200 may include the CRL processing unit 210 and reception unit 215, and the CRL processing unit 210 may include the CRL updating unit 222 and CRL storage unit 223.

According to this configuration, when the new home appliance device 200*d* is added to the authentication system 10, the device 200 receives the CRL version from the new home appliance device 200*d*, the CRL updating unit 222 confirms whether there is a need to update the CRL, and can update the CRL of the CRL storage unit 223. This does away with the need to compare CRL versions or perform notification of CRL transmission requests, and a CRL can be updated if necessary, without any exchange with the new home appliance device 200*d*.

Figure 42:
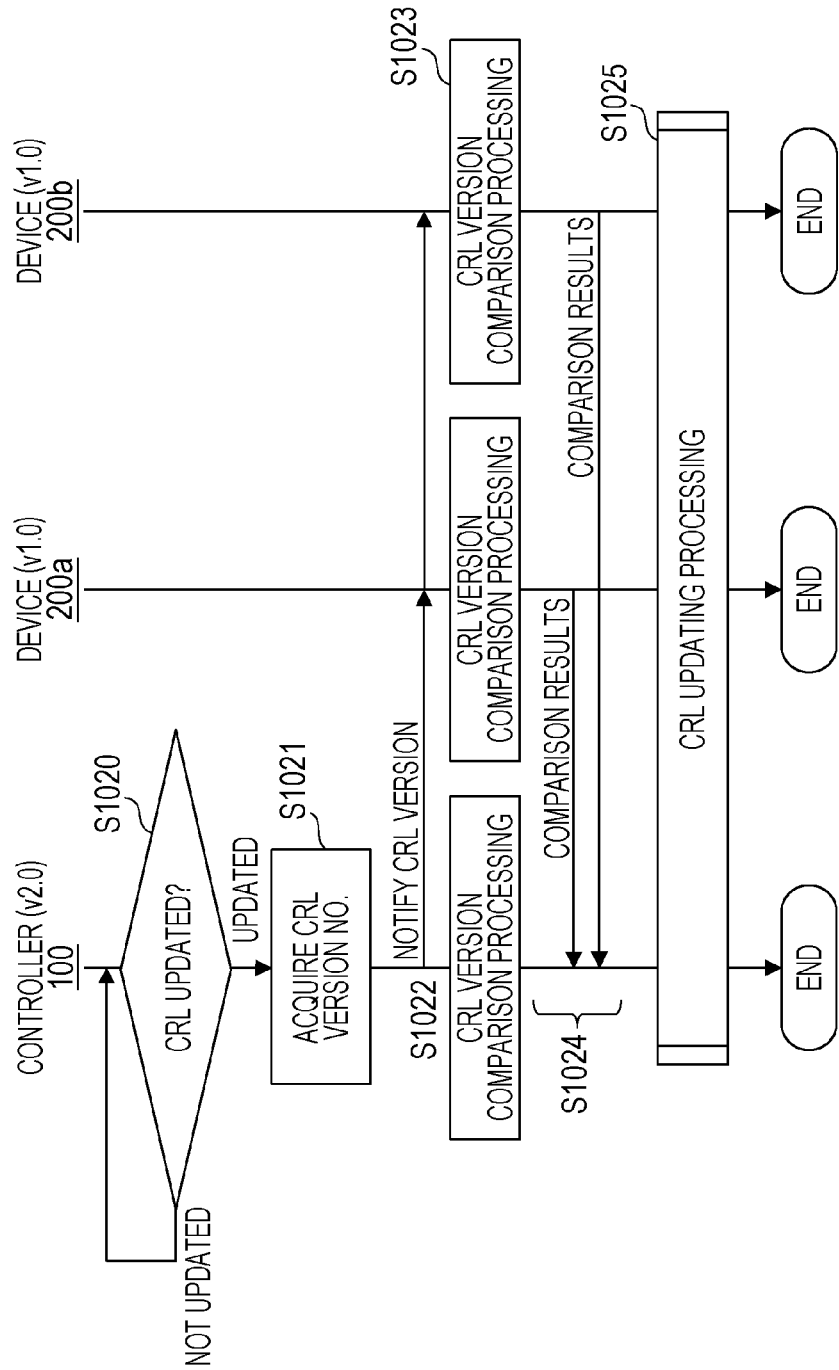
FIG. 42 is a diagram a CRL updating processing sequence according to a modification (17)

(17) The CRL updating processing in the above embodiments executes processing, triggered by addition of the new home appliance device 200*d* to the authentication system 10, but this is not restrictive. The trigger may be the controller 100 acquiring a new CRL from the server 300 or the like and updating (S1020), as illustrated in FIG. 42 for example. The trigger may also be a device connectable to multiple networks acquiring a new CRL from a separate network, and updating. Subsequent updating processing (Steps S1021 through S1025) is the same as a case of adding the new home appliance device 200*d* to the authentication system 10 (FIG. 24). According to the above configuration, another device within the same network updating the CRL enables all other devices within that network to update their CRLs.

(18) The CRL updating processing in the above embodiments is performed when the new home appliance device 200*d* is added to the authentication system 10, but this is not restrictive. The CRL version may be notified the devices within the authentication system 10 when a devices that is connectable to other systems is reconnected to the authentication system 10. Accordingly, the CRL can be updated while connected to another system, and the updating results can be reflected in devices within the authentication system 10. Examples of such devices include cellular phones and smartphones that connect to a telephone communication network, mobile devices such as laptop PCs, audio players, and so forth, that connected to LANs of multiple facilities, batteries (including automobile batteries) that connect to charging systems at various locations, and so forth. Cellular phones, smartphones, laptop PCs, audio players, and so forth, connected to cellular phone communication networks, public line LANs, and so forth, when away from home, and exchange various types of information. It is conceivable that these devices may be used for information confirmation and operation of devices within the home such as home appliance devices or the like, upon returning home. When the user performs information confirmation and operation of devices within the home such as home appliance devices or the like using the device such as a cellular phone or the like upon returning home, the device such as a cellular phone or the like notifies the CRL version to the devices within the home such as home appliance devices or the like, whereby the CRLs of the devices within the home such as home appliance devices or the like can be updated.

(19) The CRL updating processing in the above embodiments is performed when the new home appliance device 200*d* is added to the authentication system 10, but this is not restrictive. The device that notifies the CRL version is not restricted to a device added to the authentication system 10 and registered as a device therein. For example, in a case of a device having wireless communication (radio, light, sound, etc.) functions, the device may notify the CRL version to all devices within a range reachable by the wireless communication, and even if not registered in the authentication system 10, may notify the CRL version to other devices within the same network. Accordingly, if a neighbor purchase a new device for example, devices within range of wireless communication will be able to update their CRLs. Even devices not added to the authentication system 10 will be able to update the CRL when a new device is introduced. Further, an electric vehicle in which a battery is installed can update CRLs of devices along the road simply by driving down the road. Accordingly, the opportunity for devices within the authentication system 10 to be updated increases.

(20) The CRL updating processing in the above embodiments is performed when the new home appliance device 200*d* is added to the authentication system 10, but this is not restrictive. The CRL version may be notified to other devices within the authentication system 10 when the power is turned on to the device or when returning from a sleep state, or when reconnecting to the network, or notification may be made periodically or at random timings. Accordingly, in a case where the new home appliance device 200*d* is added to the authentication system 10 in a state where the power is off or in a sleep state, or cut off from the network, the CRL can be updated. The new home appliance device 200*d* also can update the CRLs of devices having old CRL versions by notifying the CRL version at the above-described timings after connection to the authentication system 10, not just at the time of connection.

(21) The CRL updating processing in the above embodiments is performed when the new home appliance device 200*d* is added to the authentication system 10, but this is not restrictive. An arrangement may be made where a list of devices participating in the authentication system 10 is compiled beforehand, confirmation is made regarding comparison results of the CRL version when performing CRL updating processing, and whether there is a device that did not transmit a CRL transmission request is checked by comparing with the list. In a case where there is a device that has not transmitted a CRL transmission request, the CRL version may be periodically notified, to perform CRL updating processing later. Accordingly, the CRLs of all devices within the authentication system 10 can be updated.

(22) In the above embodiments, the new home appliance device 200*d* notifies the CRL version to the other devices, but this is not restrictive. A device that has received notification of the CRL version from the new home appliance device 200*d* may further notify the CRL version to another device. Accordingly, the new CRL can be distributed to devices connected to a network not reachable by the new home appliance device 200*d*.

(23) In the above embodiments, the display unit 216 of the device 200 displays which devices have ended CRL updating and displays which device stores CRLs of which version, but this is not restrictive. Any device that has a display unit 216 is acceptable. For example, this may be a cellular phone or a PC, or may be a device that does not transmit the CRL version. Accordingly, the user can be notified of which device in the authentication system 10 has ended updating the CRL, and which device needs a CRL update.

(24) The above devices specifically are computer systems configured including a microprocessor, read-only memory (ROM), random access memory (RAM), a hard disk unit, a display unit, a keyboard, a mouse, or the like. A computer program is recorded in the RAM or hard disk unit. The devices realize their functions by the microprocessor operating according to the computer program. The computer program here is configured by combining multiple command codes indicating instructions to the computer, to realize predetermined functions.

(25) Part or all of the components configuring the above devise may be configured as a single system Large Scale Integration (LSI). A system LSI is a super-multi-functional LSI manufactured integrating multiple components on a single chip, and specifically is a computer system configured including a microprocessor, ROM, RAM, and so forth. A computer program is recorded in the RAM. The system LSI realizes its functions by the microprocessor operating according to the computer program. The parts of the components making up the above devices may be individually formed into one chip, or part or all may be included in one chip.

While description has been made regarding a system LSI, there are different names such as IC, LSI, super LSI, and ultra LSI, depending on the degree of integration. The circuit integration technique is not restricted to LSIs, and dedicated circuits or general-purpose processors may be used to realize the same. A Field Programmable Gate Array (FPGA) which can be programmed after manufacturing the LSI, or a reconfigurable processor where circuit cell connections and settings within the LSI can be reconfigured, may be used.

Further, in the event of the advent of an integrated circuit technology which would replace LSIs by advance of semiconductor technology or a separate technology derived therefrom, such a technology may be used for integration of the functional blocks, as a matter of course. Application of biotechnology is a possibility.

(26) Part or all of the components of which the above-described devices may be configured as an IC card detachably mountable to each device or a module. The IC card or standalone module is a computer system configured including a microprocessor, ROM, RAM, and so forth. The IC card or module may include the above-described super-multi-functional LSI. The IC card or module achieves its functions by the microprocessor operating according to the computer program. The IC card or module may be tamper-resistant.

(27) The present disclosure may be the above-described methods, or may be a computer program which realizes these methods by a computer, or may be digital signals made up of the computer program. The present disclosure may be the computer program or the digital signals recorded in a computer-readable recording medium, such as for example, a flexible disk, a hard disk, a CD-ROM, MO, DVD, DVD-ROM, DVD-RAM, BD Blu-ray (BD) (a registered trademark) Disc, semiconductor memory, or the like. The present disclosure may also be the digital signals recorded in these recording mediums.

The present disclosure may be an arrangement where the computer program or the digital signals are transmitted over an electric communication line, wireless or cable communication line, a network of which the Internet is representative, data broadcasting, or the like.

The present disclosure may be a computer system having a microprocessor and memory, where the memory records the computer program, and the microprocessor operates according to the computer program.

The present disclosure may also be carried out by another independent computer system, by the program or digital signals being recorded in the recording medium and being transported, or by the program or digital signals being transferred over the network or the like.

(28) The above-described embodiment and the above-described modifications may be combined.

According to the present disclosure, in a system where a device and controller are connected, even if the device is connected to an unauthorized controller, a CRL can be acquired via a newly-purchased device, whereby the unauthorized controller can be detected.

What is claimed is:

1. A method for execution in an authentication system, the method comprising:
receiving, by a second device of the authentication system and from a first device of the authentication system, first version information of a first certificate revocation list, the first device managing a list of revoked certificates as the first certificate revocation list including the first version information, the first device being added to the authentication system after the second device and after a third device of the authentication system, wherein one or more devices from the first device, the second device and the third device comprises a home appliance or a housing facility device;
comparing, by the second device, second version information of a second certificate revocation list with the first version information of the first certificate revocation list, the second device managing a list of revoked certificates as the second certificate revocation list including the second version information;
updating, by the second device, the second certificate revocation list using the first certificate revocation list, in a first case where the second version information of the second certificate revocation list is older than the first version information of the first certificate revocation list;
performing, by the second device and in response to determining that the third device is registered in the updated second certificate revocation list, batch transmission of an identifier of the third device to a plurality of devices of the authentication system; and
deleting, by the second device and in response to determining that the third device is registered in the updated second certificate revocation list, registration of the third device from the authentication system.

2. The method according to claim 1, further comprising:
transmitting, by the second device and in the first case where the second version information of the second certificate revocation list is older than the first version information of the first certificate revocation list, a transmission request for the first certificate revocation list to the first device; and
transmitting, by the first device and in response to a receipt of the transmission request for the first certificate revocation list from the second device, the first certificate revocation list to the second device.

3. The method according to claim 1, further comprising:
performing, by the second device in a second case where the second version information of the second certificate revocation list is newer than the first version information of the first certificate revocation list, batch transmission of the second version information of the second certificate revocation list to the plurality of devices and the first device;
comparing, by the first device, the first version information of the first certificate revocation list with the second version information of the second certificate revocation list; and
updating, by the first device and in the second case where the first version information of the first certificate revocation list is older than the second version information of the second certificate revocation list, the first certificate revocation list using the second certificate revocation list.

4. An authentication device capable of participation in an authentication system where authentication processing is performed using certificates, the authentication device comprising:

one or more memories; and circuitry, which in operation, receives, from a first device that is added to the authentication system after the authentication device and a third device, a first certificate revocation list including a list of revoked certificates and first version information, wherein the first device manages the first certificate revocation list and one or more devices from the first device, the authentication device and the third device comprise a home appliance or a housing facility device;

manages a second certificate revocation list including a list of revoked certificates and second version information;

compares the first version information of the first certificate revocation list with the second version information of the second certificate revocation list, updates the second certificate revocation list using the first certificate revocation list received from the first device, in a case where the second version information of the second certificate revocation list is older than the first version information of the first certificate revocation list, and performs batch transmission of an identifier of the third device to a plurality of devices of the authentication system, in response to determining that the third device is registered in the updated second certificate revocation list; and deletes, in response to determining that the third device is registered in the updated second certificate revocation list, registration of the third device from the authentication system.

* * * * *